United States Patent
Mase et al.

(10) Patent No.: US 7,134,336 B2
(45) Date of Patent: Nov. 14, 2006

(54) VIBRATION TYPE ANGULAR VELOCITY SENSOR

(75) Inventors: Shunji Mase, Handa (JP); Kenji Hirano, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/075,886

(22) Filed: Mar. 10, 2005

(65) Prior Publication Data

US 2005/0204815 A1    Sep. 22, 2005

(30) Foreign Application Priority Data

Mar. 19, 2004  (JP) .............................. 2004-081322
Mar. 25, 2004  (JP) .............................. 2004-090459

(51) Int. Cl.
*G01P 9/04*  (2006.01)
*G01P 21/00* (2006.01)

(52) U.S. Cl. .............................. 73/504.12; 73/504.14; 73/1.37

(58) Field of Classification Search ............. 73/504.12, 73/504.02, 504.04, 504.14, 1.37, 1.38, 1.77, 73/504.16

See application file for complete search history.

(56) References Cited

U.S. PATENT DOCUMENTS 6,584,841 B1    7/2003  Ichinose et al.
6,608,425 B1 *  8/2003  Ebara et al. ........... 310/316.01
6,934,665 B1 *  8/2005  Rober ....................... 702/189

FOREIGN PATENT DOCUMENTS

JP    A-2003-21517    1/2003

* cited by examiner

*Primary Examiner*—Helen Kwok
(74) *Attorney, Agent, or Firm*—Posz Law Group, PLC

(57) ABSTRACT

A vibration type angular velocity sensor includes: a first and a second angular velocity sensors; and an anomaly monitoring signal generating and outputting unit including an opposite phase waveform synthesis portion. The first and the second angular velocity sensors include: a vibrator; a vibration driving unit; and a detection waveform generation unit. The opposite phase waveform synthesis portion synthesizes the first and the second detection waveforms with opposite phase. The anomaly monitoring signal generating and outputting unit generates and outputs an anomaly monitoring signal on the basis of a synthesized opposite phase waveform synthesized from the first and the second detection waveforms.

15 Claims, 12 Drawing Sheets

$\Sigma_1 + \Sigma_2$ $-(\Sigma_3 + \Sigma_4)$

SK

FIG. 12A
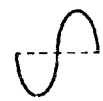
FIG. 12C
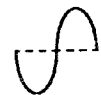
FIG. 12B
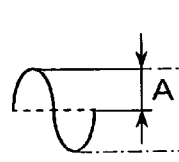
FIG. 12D
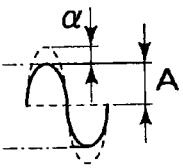
FIG. 12E
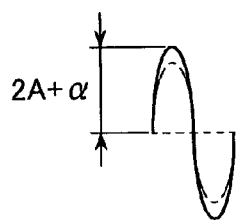
FIG. 12G
FIG. 12F
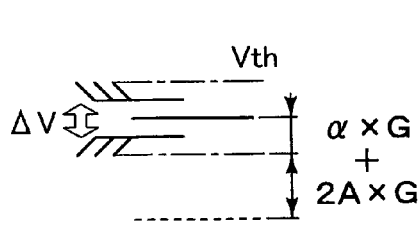
FIG. 12H
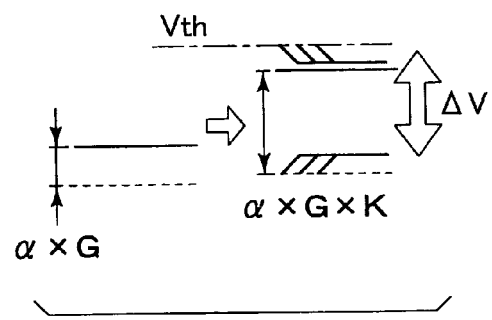

VIBRATION TYPE ANGULAR VELOCITY SENSOR

CROSS REFERENCE TO RELATED APPLICATIONS

This application is based on Japanese Patent Applications No. 2004-81322 filed on Mar. 19, 2004, and No. 2004-90459 filed on Mar. 25, 2004, the disclosures of which are incorporated herein by reference.

FIELD OF THE INVENTION

The present invention relates to a vibration type angular velocity sensor.

BACKGROUND OF THE INVENTION

There are various types of angular velocity sensors (gyro sensors) depending on the method of operation. Known types of angular velocity sensors include: mechanical type that utilizes the precession of a body of rotation; optical type that utilizes change in the timing of light reception due to the rotation of laser light that is rotated in an enclosure; and fluid type wherein a jet of gas for sensing is directed at a heat ray, and change in jet quantity due to the rotation of an enclosure is detected through heat ray temperature. Recently, demand for angular velocity sensors for vehicle direction detection in car navigation systems or the like has been rapidly increased. As a result, vibration type angular velocity sensors that are inexpensive and lightweight as compared with the above-mentioned types are going mainstream. The vibration type angular velocity sensor is so constructed that the following takes place: when angular velocity is exerted on vibrators that vibrate in a predetermined reference direction, a new vibration component is detected. This new vibration component (hereafter, referred to as "angular velocity vibration component") is based on Coriolis force in the direction of detection orthogonal to the reference direction. Based on the vibration component, angular velocity information is outputted.

Conventionally, the following are publicly known as systems wherein vehicle control is carried out using an angular velocity sensor: vehicle stability control system wherein skid of a vehicle is detected, and the brake and torque on each wheel are optimally controlled to keep the vehicle in normal conditions; four-wheel steering angle control system wherein the steering angle of the front wheels or rear wheels of a vehicle is controlled; and the like. These types of systems use an angular velocity sensor to detect abnormal conditions of vehicles such as slide. Thus, it is demanded to enhance the reliability of the angular velocity signal.

Vibration type angular velocity sensors are characterized by the following: when translational acceleration is applied to a vehicle during angular velocity detection, it is superposed as noise on angular velocity detection wave form based on Coriolis force. The technique disclosed in Japanese Unexamined Patent Application Publication No. 2003-21517 adopts the following method: two sets of vibration type sensor units that are driven in opposite phases are combined together, and the outputs of the sensor units produced in opposite phases are differentially amplified; the acceleration component is thereby canceled. Japanese Unexamined Patent Application Publication No. 2003-21517 discloses the following as a common means for use in vehicle control: the output system of an angular velocity sensor is divided into main and sub; the sub output is used as backup for the main output. When any trouble occurs in either output system, it can be detected by comparing the output of the sub output system and that of the main output system.

The technology disclosed in Japanese Unexamined Patent Application Publication No. 2003-21517 adopts the following method for canceling acceleration: the outputs of two sensor units are synthesized beforehand, and the synthesized output is divided into sub output and main output. However, this method involves a problem. The first and second sensor units form the basis of sensor output. When any trouble occurs in a component (e.g. a vibrator or an electrode for vibration detection) internal to the sensor units, it cannot be detected. This is because a particular difference is not produced between sub output and main output unless the output system is faulty. Thus, it is required for the vibration type angular velocity sensor to detect anomalies with ease and reliability even when any trouble occurs in individual sensor units.

Further, if the driving amplitude of a vibrator gets out of a predetermined range in a vibration type angular velocity sensor, some anomaly can occur in the zero point or the sensitivity of angular velocity sensor output. Therefore, it is required to detect the driving amplitude and determine whether it is within the predetermined range or not. Specifically, the following operation is performed as disclosed in Japanese Unexamined Patent Application Publication No. 2000-88578: the driving amplitude of vibrators is detected with piezoelectric elements, and is subjected to charge-voltage conversion. Further, rectification is carried out, and the rectified signal is used as an amplitude monitoring signal. Anomaly detection is carried out based on whether the level of this amplitude monitoring signal is within a predetermined range or not.

If translational acceleration is applied to a vehicle during angular velocity detection, the following occurs in a vibration type angular velocity sensor: the translational acceleration is superposed as noise on angular velocity detection waveform based on Coriolis force. The technology disclosed in Japanese Unexamined Patent Application Publication No. 2000-88578 adopts the following method: two sets of vibration type sensor units that are driven in opposite phases are combined, and the outputs of the sensor units produced in opposite phases are differentially amplified. Thus, the acceleration components are canceled out. In this case, the vibrators of the two units must be synchronously driven. In amplitude control at a vibration driving unit, amplitude monitoring signals individually taken out of the individual units are added in phase, and the sensitivity for amplitude monitoring signal is thereby enhanced. The amplitude monitoring signals obtained as the result of addition are also used in anomaly detection.

If any anomaly occurs in a sensor unit, the following takes place in the amplitude monitoring signal obtained as the result of addition: anomalous amplitude components are superposed on fiducial amplitude expected in normal operation. When two sensor units are combined and used, as mentioned above, a problem arises. The following procedure must be taken if the amplitude monitoring signal obtained as the result of addition is used for anomaly detection: as illustrated in the left part of FIGS. 12A to 12H, an anomalous vibration component α must be detected, together with a fiducial amplitude component A twofold amplified, with the same signal amplification factor G. However, there is a limitation on the signal amplification factor G for the reason of the operating voltage of the circuit. A restriction is imposed on the allowable margin for superposition of the anomalous amplitude component α to the fiducial amplitude A. Thus, anomalies cannot be detected with accuracy.

SUMMARY OF THE INVENTION

In view of the above-described problem, it is an object of the present invention to provide a vibration type angular velocity sensor capable of detecting anomalies occurred in an individual sensor unit with ease and reliability and detecting anomalies of vibration driving amplitude with accuracy. Further, it is another object of the present invention to provide a vibration type angular velocity sensor capable of detecting anomalies occurred in an individual sensor unit with ease and reliability. Furthermore, it is further another object of the present invention to provide a vibration type angular velocity sensor capable of detecting anomalies of vibration driving amplitude with accuracy.

A vibration type angular velocity sensor includes: a first angular velocity sensor and a second angular velocity sensor; and an anomaly monitoring signal generating and outputting unit including an opposite phase waveform synthesis portion. Each of the first and the second angular velocity sensors includes: a vibrator for being vibrated in a predetermined reference direction; a vibration driving unit for vibrating the vibrator with a predetermined constant amplitude; and a detection waveform generation unit for detecting a vibration component in an angular velocity detection direction perpendicular to the reference direction in accordance with an angular velocity applied to the vibrator and for generating a first or a second detection waveform on the basis of the vibration component. The opposite phase wave form synthesis portion synthesizes the first detection waveform obtained from the first angular velocity sensor and the second detection waveform obtained from the second angular velocity sensor in such a manner that a phase of the first detection waveform is opposite to that of the second detection waveform. The first detection waveform is generated in accordance with a displacement of the vibrator in the first angular velocity sensor, and the second detection waveform is generated in accordance with a displacement of the vibrator in the second angular velocity sensor. The anomaly monitoring signal generating and outputting unit generates and outputs an anomaly monitoring signal for monitoring an anomaly of a sensor output on the basis of a synthesized opposite phase waveform synthesized from the first and the second detection waveforms.

The above sensor detects anomalies occurred in an individual sensor unit with ease and reliability and further detects anomalies of vibration driving amplitude with accuracy.

Preferably, the sensor further includes a signal output unit including an in-phase waveform synthesis portion. The vibration driving unit vibrates the vibrators of the first and the second angular velocity sensors synchronously. The in-phase waveform synthesis portion synthesizes the first detection waveform and the second detection waveform in such a manner that a phase of the first detection waveform and a phase of the second detection waveform are in-phase. The signal output unit outputs a synthesized in-phase waveform synthesized from the first and the second detection waveforms as an angular velocity signal, in which acceleration waveform components superposed on the first and the second detection waveforms are canceled. The sensor detects anomalies occurred in an individual sensor unit with ease and reliability.

Preferably, the sensor further includes: a first amplitude monitor for detecting a driving amplitude of the vibrator in the first angular velocity sensor in the reference direction to output the first detection waveform; and a second amplitude monitor for detecting a driving amplitude of the vibrator in the second angular velocity sensor in the reference direction to output the second detection waveform. The sensor detects anomalies of vibration driving amplitude with accuracy.

BRIEF DESCRIPTION OF THE DRAWINGS

The above and other objects, features and advantages of the present invention will become more apparent from the following detailed description made with reference to the accompanying drawings. In the drawings:

FIGS. 12A to 12H are graphs of waveforms explaining effect and function of the vibration type angular velocity sensor according to the second embodiment.

DETAILED DESCRIPTION OF THE PREFERRED EMBODIMENTS (First Embodiment)

Figure 1:
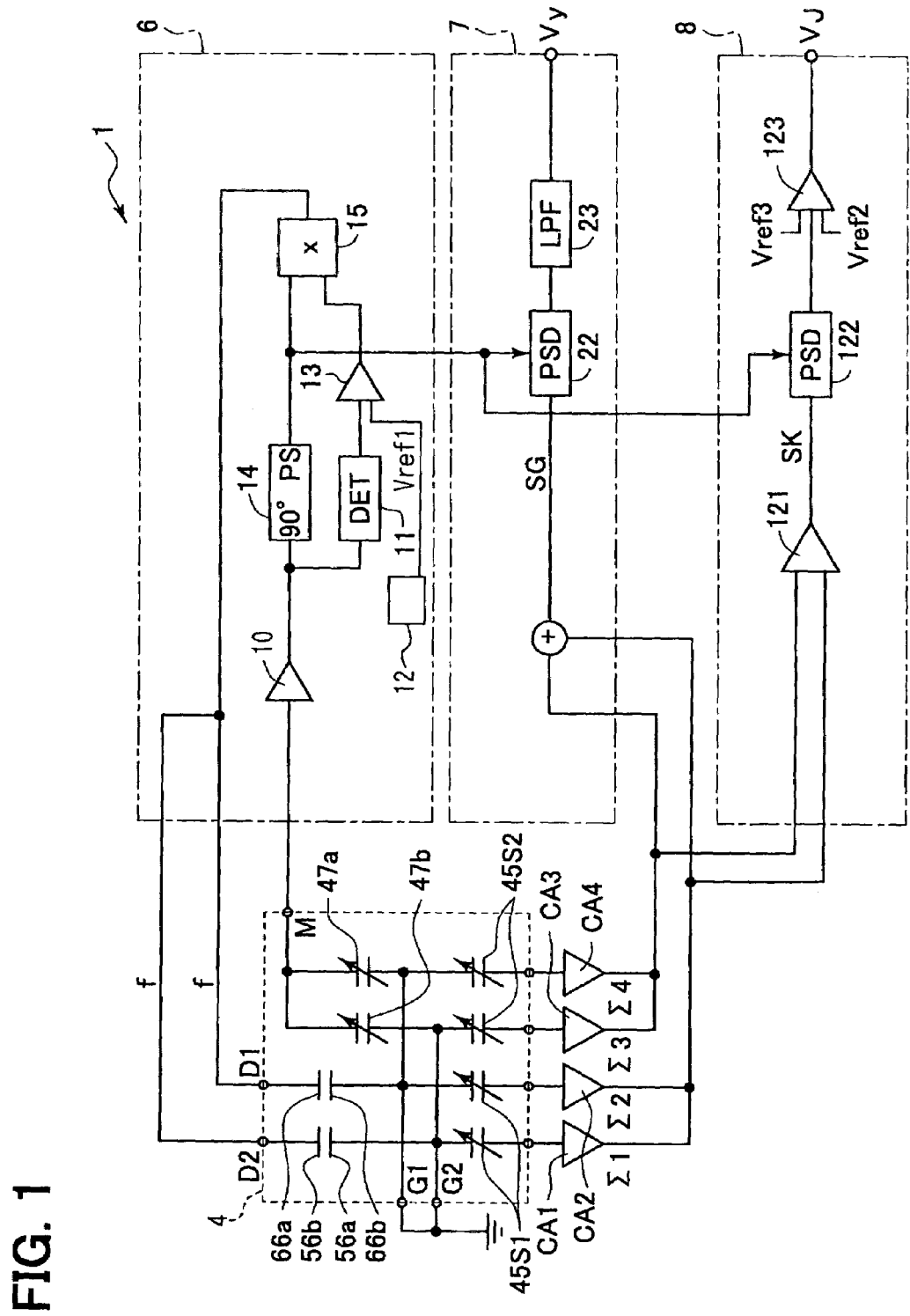
FIG. 1 is a circuit diagram showing a vibration type angular velocity sensor according to a first embodiment of the present invention.
Figure 2:
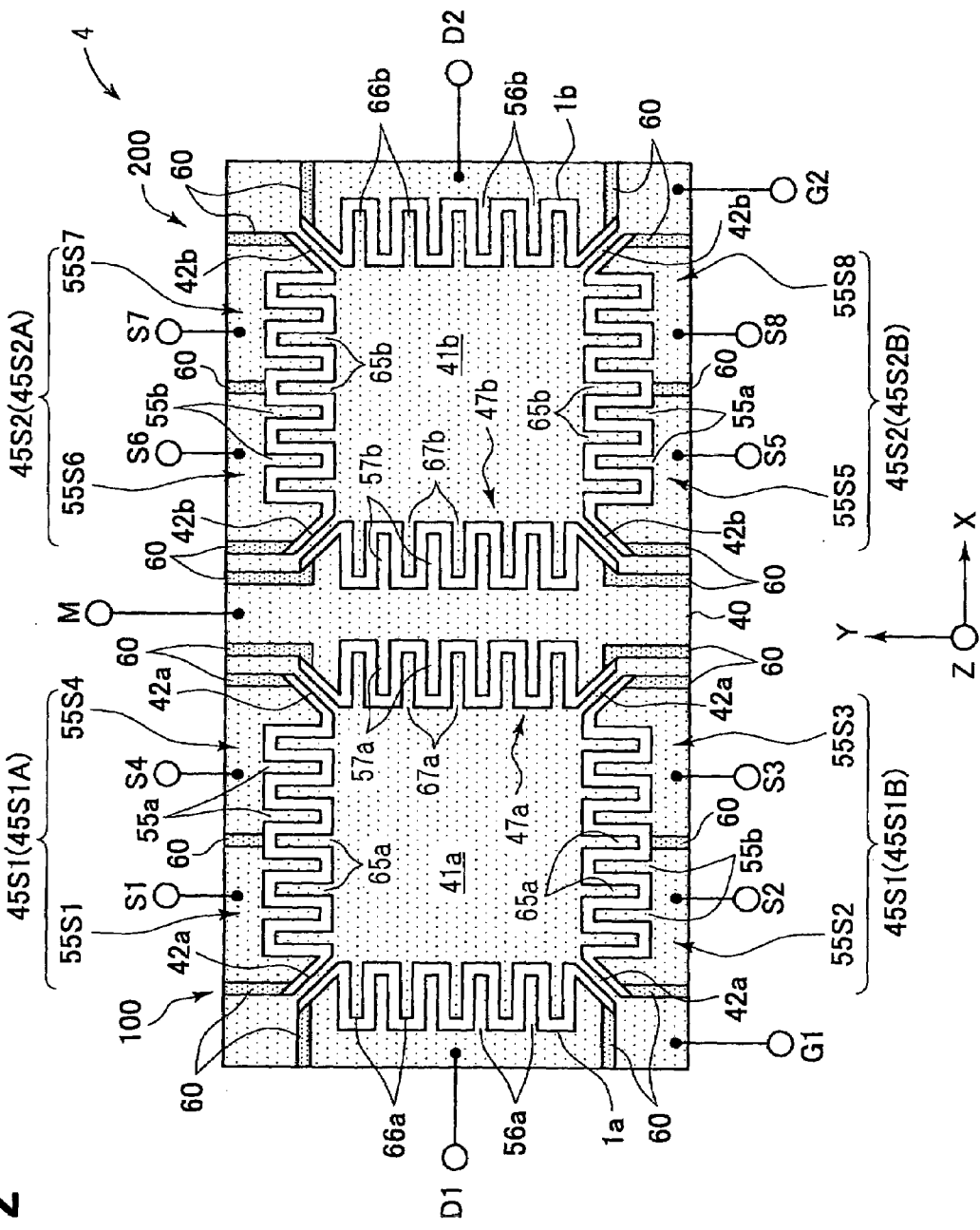
FIG. 2 is a plan view showing the first and the second sensor units in the vibration type angular velocity sensor according to the first embodiment.

FIG. 1 is a circuit diagram of a vibration type angular velocity sensor 1 according to a first embodiment of the present invention. The circuit includes a vibration unit 4, a vibration driving unit 6, and an angular velocity detecting unit 7. As illustrated in FIG. 2, the vibration unit 4 comprises a first sensor unit 100 and a second sensor unit 200. The sensor units 100, 200 have vibrators 41a and 41b that vibrate in the predetermined X direction (reference direction). When angular velocity is applied to the vibrators 41a and 41*b*, a vibration component to be detected in the Y direction (direction of angular velocity detection) predetermined to be orthogonal to the X direction is detected. The detection waveform generation portions in FIG. 1 detect the waveform of the vibration component to be detected. The detection waveform generation portions are capacitors for vibration detection 45S1 and 45S2 that vary the distances between electrodes in accordance with waveform vibration to be detected. The charge change outputs of the capacitors for vibration detection 47*a*, 47*b* are turned into voltage waveform through charge-voltage conversion units CA1 to CA4. (The charge-voltage conversion units can be constructed of publicly known charge amplifiers, for example.) Angular velocity detection waveform is thereby generated. When translational acceleration is applied, an acceleration waveform component is superposed on an angular velocity waveform component in vibration waveform to be detected. With respect to the first sensor unit 100 and the second sensor unit 200, the above-mentioned reference direction and direction of angular velocity detection are predetermined so that the following occurs: due to opposite phase vibration type driving of the vibrators 41*a* and 41*b*, their vibration waveforms to be detected are in phase in either of the angular velocity waveform component and the acceleration waveform component superposed thereon, and are in opposite phases in the other. (That is, the directions are predetermined so that either the acceleration waveform component or the angular velocity waveform component can be canceled by addition or difference.) In this embodiment, the first sensor unit 100 and the second sensor unit 200 are disposed adjacently to each other in the X direction. The vibrators 41*a* and 41*b* are vibratorily driven in mirroring-like symmetric relation in the X direction. However, the first embodiment of the present invention is not limited to this constitution.

The vibration unit 4 is formed using semiconductor micromachining technology for Silicon or the like, for example. In the constitution illustrated in FIG. 2 as an example, the vibrator 41*a* of the first sensor unit 100 is attached to a frame 40 through beams 42*a*. The vibrator 41*b* of the second sensor unit 200 is attached to another frame 40 integral with the above frame 40 through beams 42*b*. The vibrators 41*a* and 42*a* are attached to the frames 40 so that they can be independently vibrated in the X direction and in the Y direction orthogonal thereto.

Comb-like driving-side fixed electrodes 56*a* and 56*b* are installed on the inside surfaces of the ends of the frames 40 of the sensor units 100 and 200 in the X direction (that is, in the direction of vibration type driving). The fixed electrodes 56*a* and 56*b* are unit electrodes for the X direction and arranged at equal intervals in the Y direction. Comb-like driving-side movable electrodes 66*a* and 66*b* are installed on the end faces of the vibrators 41*a* and 41*b* in the X direction. The movable electrodes 66*a* and 66*b* are unit electrodes for the X direction and are arranged at equal intervals in the Y direction with a gap between them and the driving-side fixed electrodes 56*a* and 56*b*. The fixed electrodes 56*a* and 56*b* and the movable electrodes 66*a* and 66*b* are arranged in a staggered format.

Capacitors for vibration detection 45S1 and 45S2 are provided at the ends of the sensor units 100 and 200 in the Y direction (that is, in the direction of angular velocity detection). Specifically, comb-like detection-side fixed electrodes 55*a* and 55*b* are formed on the inside surfaces of the ends of the frames 40 in the Y direction. The fixed electrodes 55*a* and 55*b* are unit electrodes for the Y direction and arranged at equal intervals in the X direction. Comb-like detection-side movable electrode 65*a* and 65*b* are installed on the corresponding end faces of the vibrators 41*a* and 41*b* in the Y direction. The movable electrodes 65*a* and 65*b* are unit electrodes for the Y direction and arranged at equal intervals in the X direction with a gap between them and the detection-side fixed electrodes 55*a* and 55*b*. The fixed electrodes 55*a* and 55*b* and the movable electrodes 65*a* and 65*b* are arranged in a staggered format. These detection-side movable electrodes 65*a* and 65*b* and detection-side fixed electrodes 55*a* and 55*b* form the above-mentioned capacitors for vibration detection 45S1 and 45S2.

Capacitors for monitoring amplitude 47*a* and 47*b* are provided at the ends of the sensor units 100 and 200 closest to each other in the X direction for feedback-controlling driving number of vibration. Specifically, comb-like monitor-side fixed electrodes 57*a* and 57*b* are installed on the corresponding inside surfaces of the frames 40. (The area between the inside surfaces form a partition wall portion that separates the sensor units 100 and 200 from each other.) The fixed electrodes 57*a* and 57*b* are unit electrodes for the X direction and arranged at equal intervals in the Y direction. Comb-like monitor-side movable electrodes 67*a* and 67*b* are installed at the corresponding end faces of the vibrators 41*a* and 41*b* in the X direction. The movable electrodes 67*a* and 67*b* are unit electrodes for the X direction and arranged at equal intervals in the Y direction with a gap between them and the monitor-side fixed electrodes 57*a* and 57*b*. The fixed electrodes 57*a* and 57*b* and the movable electrodes 67*a* and 67*b* are arranged in a staggered format. These monitor-side movable electrodes 67*a* and 67*b* and monitor-side fixed electrodes 57*a* and 57*b* form the above-mentioned capacitors for monitoring amplitude 47*a* and 47*b*.

With respect to the first angular velocity sensor unit 100 and the second angular velocity sensor unit 200 in FIG. 2, the following operation is performed: the respective vibrators 41*a* and 41*b* are synchronously and vibratorily driven in opposite phases with constant amplitude in the X direction. In this state, when angular velocity is inputted around the Z direction orthogonal both to the X direction and to the Y direction, the following occurs (In case of mounting on an automobile, the Z direction is a direction orthogonal to the road surface.): In the vibrators 41*a* and 41*b*, angular velocity vibration components are produced in opposite phases with an amplitude corresponding to the magnitude of the angular velocity by Coriolis force. These angular velocity vibration components are produced in the Y direction (in the direction of angular velocity detection). This vibration is detected as change in the capacitances of the capacitors for vibration detection 45S1 and 45S2, and taken out through terminals S1 to S8. Thereafter, it is converted into voltage through a charge-voltage converter, and is outputted as angular velocity detection waveform.

Coriolis force is exerted on the vibrators 41*a* and 41*b* in opposite directions. For this reason, in the first capacitors for vibration detection 45S1 on the first sensor unit 100 side and the second capacitors for vibration detection 45S2 on the second sensor unit 200 side, the following occurs: the elements positioned on the side opposite to each other in the Y direction produce angular velocity detection waveforms in phase. (The elements positioned on the side opposite to each other are the terminals S1 and S4 and the terminals S5 and S8, and the terminals S2 and S3 and the terminals S6 and S7.) With respect to these angular velocity detection waveforms, as illustrated in FIG. 1, those in opposite phases in the same unit are paired. The waveforms are synthesized at charge-voltage conversion units CA1 to CA4 provided with a differential amplification function, and organized as four synthesized waveforms $\Sigma 1$ to $\Sigma 4$ each in phase. Thereafter, all the synthesized waveforms are added at the angular velocity detecting unit 7, and turned into an angular velocity signal SG.

In the units 100 and 200 in FIG. 2 that are vibratorily driven in opposite phases, Coriolis forces produced in the Y direction when angular velocity is applied around the Z direction are detected in opposite directions. Meanwhile, translational acceleration in the Y direction due to rotational centrifugal force or accidental vibration is detected in the same direction. It becomes a kind of noise component from the viewpoint of angular velocity waveform component. Waveforms whose superposed acceleration waveform components are in phase and whose angular velocity waveform components are in opposite phases between the units 100 and 200 are subjected to difference computation. (Or, waveforms whose superposed acceleration waveform components are in opposite phases and whose angular velocity waveform components are in phase are subjected to adding computation.) Thus, the acceleration components are canceled out, and only angular velocity waveform can be taken out.

The vibration driving unit 6 comprises: a charge-voltage converter 10 that converts electric charges stored in the capacitors for monitoring amplitude 47a and 47b into voltage; an AC-DC converter (rectification unit) 11 that converts its vibration type alternating-current voltage output into direct-current; a reference voltage generation unit 12 that takes the output voltage of the AC-DC converter 11 as an amplitude monitoring value and supplies the reference voltage Vref; a differential amplifier 13 that amplifies the difference between the amplitude monitoring value and the reference voltage Vref1; a phase shifter 14 that shifts the phase of the vibration type voltage output from the charge-voltage converter 10 by 90 degrees; and a multiplier 15 that multiplies the output of the differential amplifier 13 and the output of the phase shifter 14. The output of the multiplier 15 is inputted as vibration type driving voltage waveform to the respective driving terminals D1 and D2 of the first sensor unit 100 and the second sensor unit 200.

In the vibration driving unit 6, vibration of the vibrators 41a and 41b in the X direction is taken as a vibration monitoring signal out of the monitoring terminal M through change in the capacitances of the capacitors for monitoring amplitude 47a and 47b. In the sensor units 100 and 200 in FIG. 2, the monitor-side movable electrodes 67a and 67b of the capacitors for monitoring amplitude 47a and 47b are disposed as follows: the monitor-side movable electrodes 67a and 67b are disposed on the same side (left side in FIG. 2) in the direction of vibration (that is, in the X direction) relative to the fixed-side electrodes 57a and 57b. Therefore, when the vibrators 41a and 41b are synchronously vibrated in opposite phases in the X direction, the vibration monitoring waveforms from the capacitors for monitoring amplitude 47a and 47b are also in opposite phases. The vibration monitoring signal waveform is converted into a voltage signal at the charge-voltage converter 10. The signal is fed back to the driving terminals D1 and D2 through the phase shifter 14 and the multiplier 15. Thus, a self-excited vibratorily driving mechanism is constructed.

The phase shifter 14 functions to sustain mechanical vibration in proximity to the resonance point of the vibrators 41a and 41b through beams 60. The synthesized vibration monitoring signal from the differential amplifier 10 as a charge-voltage converter is separately smoothed at the AC-DC converter 11, and turned into an amplitude level signal. The difference between the amplitude level signal and the reference voltage signal from the reference voltage generation unit 12 corresponding to control amplitude level is computed at the differential amplifier 13. The output of the differential amplifier 13 is taken as an amplitude correction signal, and is multiplied by the vibration monitoring signal at the multiplier 15. Thus, driving amplitude is controlled to a constant value. The driving terminals D1 and D2 of the first sensor unit 100 and the second sensor unit 200 are formed at non-corresponding ends of the frames 40 in the X direction. The driving outputs from the multiplier 15 are inputted in phase. Thus, the vibrators 41a and 41b of both the units 100 and 200 are vibratorily driven in opposite phases with the resonance frequency in the X direction.

With respect to the above-mentioned angular velocity signal SG, the following operation is performed in the angular velocity detecting unit 7: the angular velocity waveform amplitude-modulated is demodulated at a synchronous detection portion 22, and then ripples are removed through a low-pass filter 23. Then, the signal is outputted as a direct-current acceleration signal Vy in proportion to the inputted angular velocity. In this embodiment, the vibration monitoring signal from the phase shifter 14 is used for the reference frequency signal for the synchronous detection portion 22. Coriolis force is produced in proportion to the vector product of the velocity of a vibrator and applied angular velocity. Therefore, the detection waveform of Coriolis force is detected as advanced by 90 degrees from driving vibration waveform without fail. Consequently, the driving vibration waveform advanced by 90 degrees at the phase shifter 14 is identical in phase with the detection waveform of Coriolis force (that is, angular velocity waveform). Thus, it can be optimally used as a reference frequency signal for synchronous detection.

In FIG. 1, the first angular velocity detection waveforms Σ1 and Σ2 from the first angular velocity sensor unit 100 and the second angular velocity detection waveforms Σ3 and Σ4 from the second angular velocity sensor unit 200 are inputted to the anomaly monitoring signal generating and outputting unit 8. The first angular velocity detection waveforms Σ1 and Σ2 and the second angular velocity detection waveforms Σ3 and Σ4 have been already synthesized so that all are in phase. These waveforms are synthesized in such phase relation that they are in opposite phases. For this purpose, they are inputted to a differential amplifier 121 that constitutes an opposite phase waveform synthesis portion. The resultant opposite phase synthesized waveform signal SK goes through a synchronous detection portion 122 and a wind comparator 123 that constitutes a voltage detection portion, and is outputted as an anomaly monitoring signal VJ.

Figure 4A:
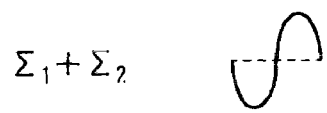
FIGS. 4A to 4F are graphs of waveforms explaining effect and function of the vibration type angular velocity sensor according to the first embodiment.
Figure 4D:
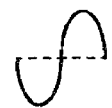
Figure 4B:
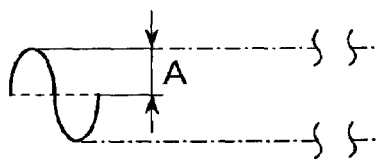
Figure 4E:
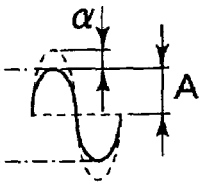
Figure 4C:
Figure 4F:
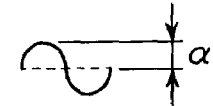

The two sensor units 100 and 200 in FIG. 2 are constructed equivalently in terms of hardware. Therefore, when the same angular velocity is applied, theoretically, they output angular velocity detection waveforms with substantially the same amplitude (FIG. 1: Σ1+Σ2, Σ3+Σ4). Therefore, when these angular velocity detection waveforms (Σ1+Σ2 and Σ3+Σ4) are synthesized in opposite phases at the differential amplifier 121, as illustrated in FIGS. 4A to 4F, the following occurs: when there is no anomaly in both the sensor units 100 and 200, the waveforms cancel out each other, and the output SK of the differential amplifier 121 assumes flat waveform in a position in proximity to neutral point, as shown in FIGS. 4A to 4C. When any anomaly occurs in the driving amplitude of either sensor unit 100 or 200, the following occurs: a difference a due to the contributing factor of the anomaly is produced in the angular velocity detection waveforms Σ1+Σ2 and Σ3+Σ4, and this gets canceling out of balance, as shown in FIGS. 4D to 4F.

As a result, the amplitude value of the output SK of the differential amplifier 121 is shifted from the neutral point. Therefore, when the signal output SK obtained as the result of synchronous detection is inputted to the wind comparator 123 having reference voltage ranges "Vref2 and Vref 3" including the above-mentioned neutral point, the following can be implemented: a signal indicating whether the signal output SK is within the predetermined ranges or not, that is, whether the signal output SK is abnormal or not can be outputted as an anomaly monitoring signal VJ from the wind comparator 123.

In this embodiment, as illustrated in FIG. 2, the electrodes positioned on the signal output side of the capacitors for vibration detection 45S1 and 45S2, that is, the detection-side fixed electrodes are divided into a plurality of partial electrodes. More specific description will be given. On the first sensor unit 100 side, the detection-side fixed electrodes are divided into a partial electrode 55S1 and a partial electrode 55S4, and a partial electrode 55S2 and a partial electrode 55S4; on the second sensor unit 200 side, the detection-side fixed electrodes are divided into a partial electrode 55S6 and a partial electrode 55S7, and a partial electrode 55S5 and a partial electrode 55S8. The charge change outputs of the capacitors for vibration detection 45S1 and 45S2 are taken out of the partial electrodes 55S1 to 55S8 in the form of divided outputs (terminals S1 to S8). The fixed-side electrodes of the capacitors for vibration detection 45S1 and 45S2 are divided into partial electrodes, and their charge changes are individually taken out of the individual partial electrodes in the form of divided outputs. Thus, even when any anomaly such as chipping or warp of a unit electrode that constitutes the comb-like electrodes, so minor that it remains in individual partial electrodes, occurs, the following advantage is brought: the influence of the anomaly largely manifests itself in the divided outputs of the partial electrodes, and thus the anomaly can be detected with higher accuracy.

In this embodiment, the capacitors for vibration detection 45S1 and 45S2 have first capacitors for vibration detection 45S1A and 45S2A and second capacitors for vibration detection 45S1B and 45S2B. The first capacitors for vibration detection 45S1A and 45S2A are provided at first ends of the vibrators 41a and 41b in the direction of angular velocity detection. The second capacitors for vibration detection 45S1B and 45S2B are provided at second ends of the vibrators 41a and 41b in the direction of angular velocity detection. These first capacitors for vibration detection 45S1A and 45S2A and second capacitors for vibration detection 45S1B and 45S2B produce angular velocity detection waveforms in opposite phases. The respective electrodes positioned on the signal output side are divided into first partial electrodes 55S1, 55S2, 55S6, and 55S5, and second partial electrodes 55S4, 55S3, 55S7, and 55S8. By using both the first end side and the second end side of the vibrators 41a and 41b, the number of capacitors for vibration detection can be increased, and the output of angular velocity signals can be enhanced. By dividing these electrodes positioned on the signal output side into partial electrodes, the sensitivity for anomaly detection can be enhanced. In the first capacitors for vibration detection 45S1A or 45S2A and the second capacitors for vibration detection 45S1B or 45S2B in the same sensor unit, the following occurs: both angular velocity waveform components and acceleration waveform components show up in opposite phases.

The vibrators 41a and 41b are connected, together with the electrode 65a, 66a, 67a, 65b, 66b, and 67b formed on their surfaces, to the GND terminals G1 and G2 through the beams 42b and the frames 40, and are externally connected to GND. The driving terminals D1 and D2, angular velocity waveform detection terminals S1 to S8, and vibration monitoring terminal M are formed on the surfaces of the frames 40. The driving terminals D1 and D2 are connected to the driving-side fixed electrodes 56a and 56b. The angular velocity waveform detection terminals S1 to S8 are connected to the detection-side fixed electrodes 55a and 55b (partial electrodes 55S1 to 55S8). The vibration monitoring terminal M is connected to the monitor-side fixed electrodes 57a and 57b. The terminals are electrically separated from one another by isolation portions 60.

Figure 3:
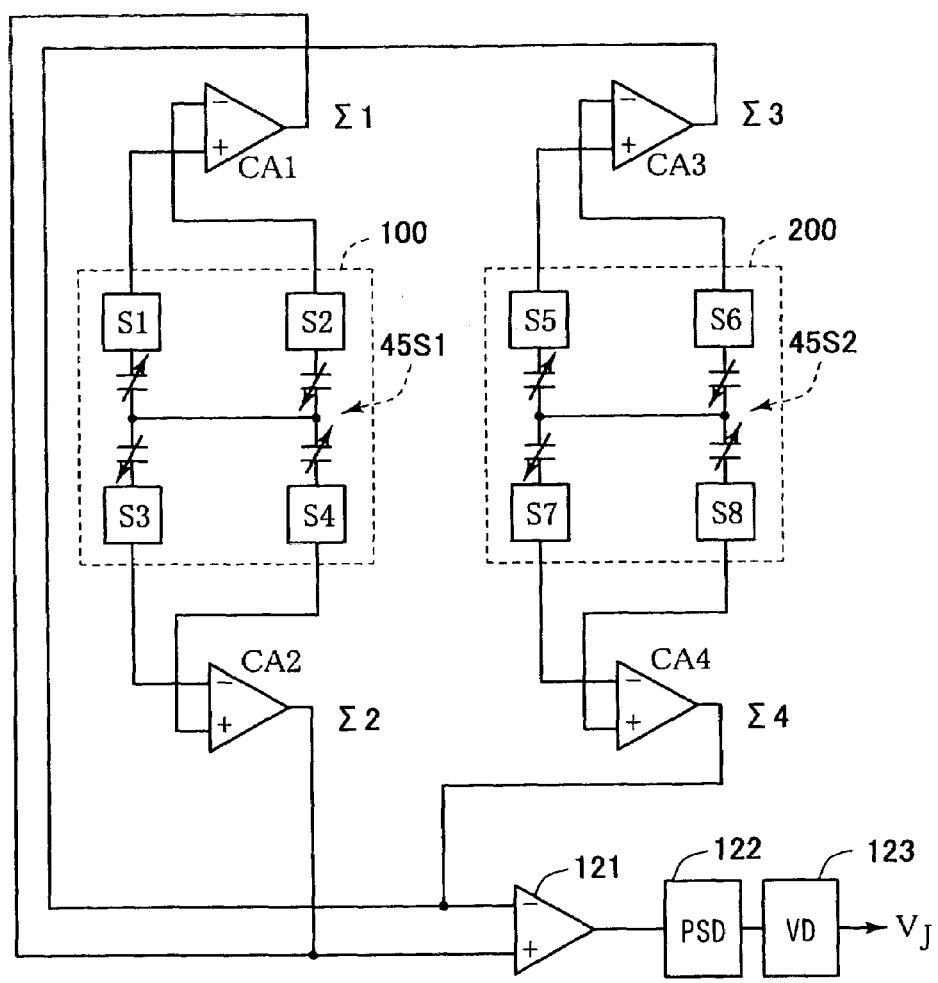
FIG. 3 is a circuit diagram showing an anomaly monitoring signal generating circuit in the vibration type angular velocity sensor according to the first embodiment.
Figure 5A:
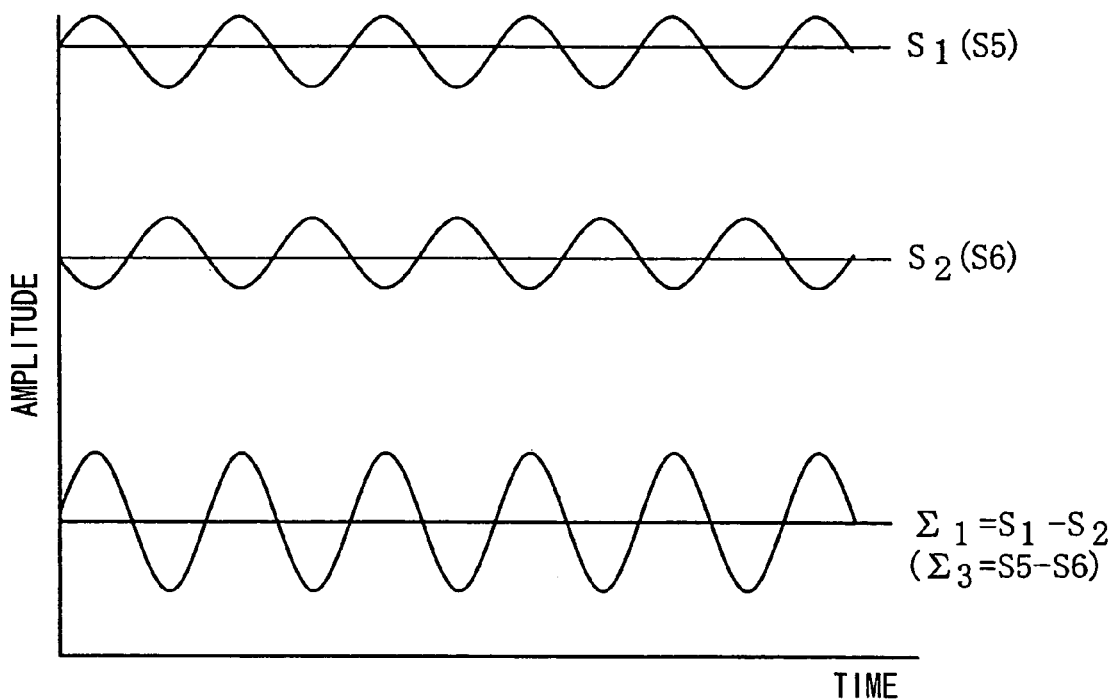
FIGS. 5A and 5B are graphs of waveforms explaining generation of an anomaly monitoring preparation signal, according to the first embodiment.
Figure 5B:
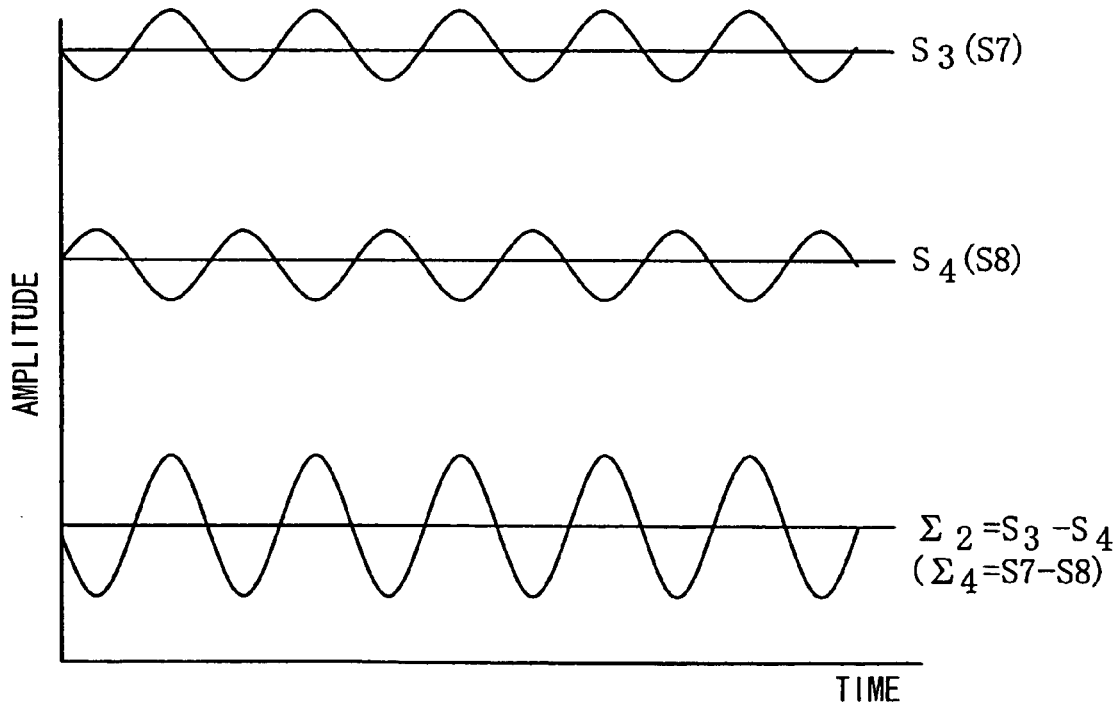

As illustrated in FIG. 3, in the first angular velocity sensor unit 100, the divided outputs (S1 and S2, and S3 and S4) from the first partial electrodes of the first capacitors for vibration detection 45S1 are synthesized; in the second angular velocity sensor unit 200, the divided outputs (S5 and S6, and S7 and S8) from the second partial electrodes of the second capacitors for vibration detection 45S2 are synthesized. The divided outputs are respectively synthesized at the difference computation portions CA1 to CA4. (In this embodiment, the difference computation portions CA1 to CA4 are also used as charge-voltage conversion portions.) As the result of syntheses, first anomaly monitoring preparation signals, i.e., the first angular velocity detection waveforms $\Sigma 1$ and $\Sigma 2$ and second anomaly monitoring preparation signals, i.e., the second angular velocity detection waveforms $\Sigma 3$ and $\Sigma 4$ in phase are obtained. As illustrated in FIGS. 5A and 5B, the thus formed anomaly monitoring preparation signals $\Sigma 1, \Sigma 2, \Sigma 3,$ and $\Sigma 4$ are added in terms of amplitude. This amplitude addition is carried out by divided outputs in opposite phases being differentially amplified. Therefore, the following advantage is brought: when any anomaly occurs in each partial electrode, the influence of the partial electrode whose output involves the anomaly largely manifests itself in the difference computation portions CA1 to CA4 provided in the capacitors for vibration detection. Therefore, with respect to the electrodes of the capacitors for vibration detection, anomaly detection can be carried out with accuracy by the anomaly monitoring preparation signals $\Sigma 1, \Sigma 2, \Sigma 3,$ and $\Sigma 4$ based thereon.

In the circuitry illustrated in FIG. 3, the difference computation portion, i.e., the differential amplifier 121 is provided. The first anomaly monitoring preparation signals $\Sigma 1$ and $\Sigma 2$ and the second anomaly monitoring preparation signals $\Sigma 3$ and $\Sigma 4$ are respectively added beforehand in the first angular velocity sensor unit 100 and the second angular velocity sensor unit 200. The difference computation portion 121 subjects to difference computation the signals from both the units 100 and 200, obtained as the result of adding computation. The difference computation portion 121 uses the signals obtained as the result of difference computation as anomaly monitoring signals. The first anomaly monitoring preparation signals $\Sigma 1$ and $\Sigma 2$ and the second anomaly monitoring preparation signals $\Sigma 3$ and $\Sigma 4$ are integrated by combinations of adding computation and difference computation. Then, they are outputted as a single-system anomaly monitoring signal. Thus, the configuration of hardware related to the generation of anomaly monitoring signals can be simplified.

Figure 6:
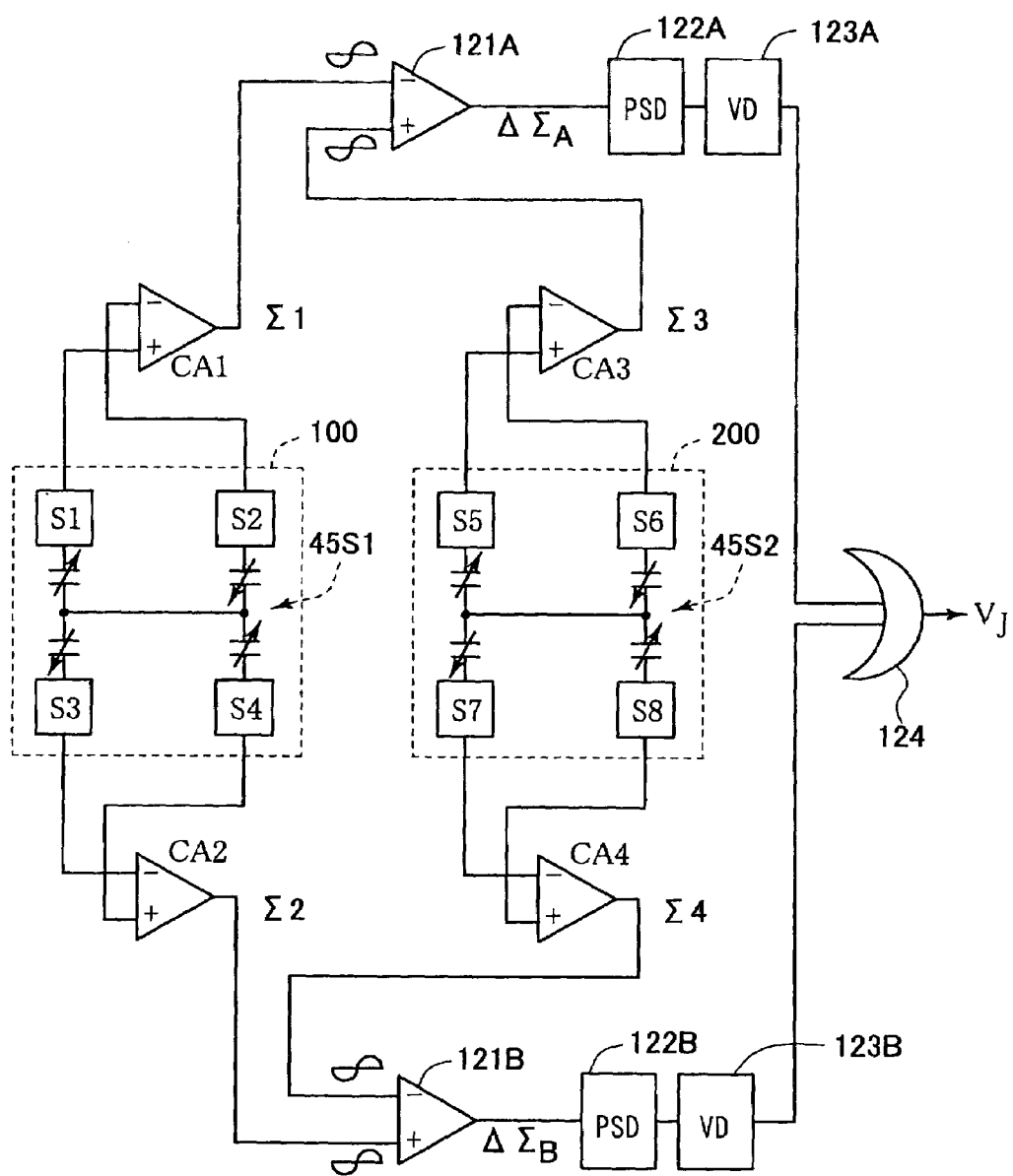
FIG. 6 is a circuit diagram showing an anomaly monitoring signal generating circuit in a vibration type angular velocity sensor according to a modification of the first embodiment.

In the constitution illustrated in FIG. 6, difference computation portions 121A and 121B can be provided in the first angular velocity sensor unit 100 and the second angular velocity sensor unit 100. The difference computation portions 121A and 121B separately subject to difference computation the first anomaly monitoring preparation signals and the second anomaly monitoring preparation signals between the units 100 and 200. With respect to the output voltages $\Delta\Sigma 1$ and $\Delta\Sigma 2$ of the difference computation portions 121A and 121B, anomaly determination is individually carried out in the respective units 100 and 200. Based on these two anomaly determination signals, ultimate anomaly determination is carried out. With this constitution, the anomaly determination signal is generated in two systems. However, the number of the partial outputs (partial electrodes) integrated into each system is reduced from eight in FIG. 3 to four. As a result, the following advantage is brought when an anomaly or trouble occurs in any of the partial electrodes: since the number of integrated partial outputs is reduced, relative change in output at the occurrence of an anomaly is accordingly increased with respect to the individual anomaly determination signals. Therefore, anomaly detection can be carried out with higher sensitivity. In this embodiment, the synchronous detection portions 122A and 122B and the wind comparators (voltage detection portions) 123A and 123B are provided with respect to each of the outputs of the difference computation portions 121A and 121B. The logical sum of binary determination outputs from the wind comparators 123A and 123B is computed at a gate 124. Its output is used as an ultimate anomaly monitoring signal VJ.

Figure 7:
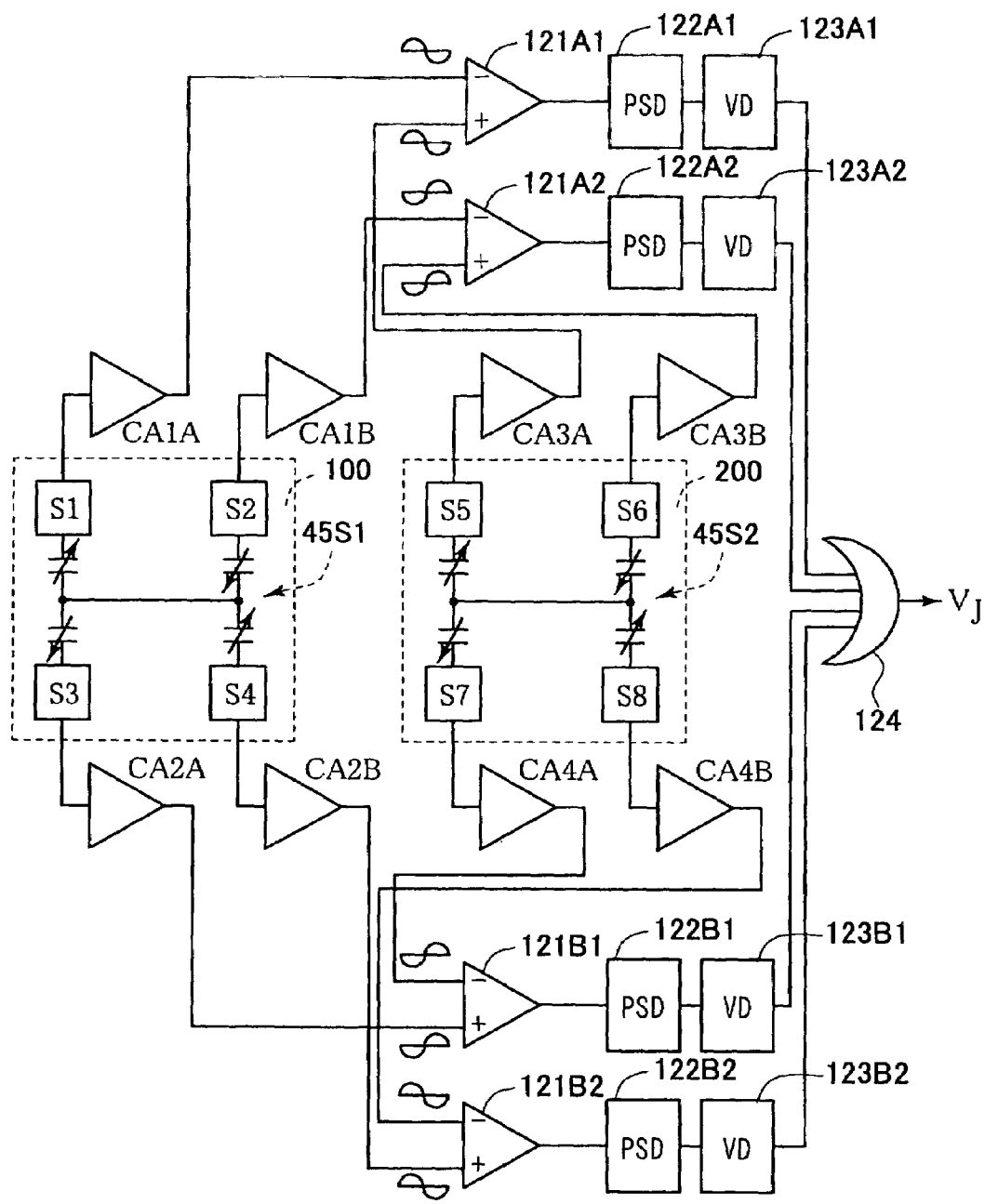
FIG. 7 is a circuit diagram showing an anomaly monitoring signal generating circuit in a vibration type angular velocity sensor according to another modification of the first embodiment.

In the constitution illustrated in FIG. 7, four difference computation portions 121A1, 121A2, 121B1, and 121B2 can be provided. The difference computation portions 121A1, 121A2, 121B1, and 121B2 individually subject the following to difference computation between the first angular velocity sensor unit 100 and the second angular velocity sensor unit 200: divided outputs (S1 and S5) from the first partial electrodes 55S1 and 55S6 of the first capacitors for vibration detection 45S1A and 45S2A in FIG. 1 and divided outputs (S4 and S7) from the second partial electrodes 55S4 and 55S7; and the divided outputs (S2 and S5) from the first partial electrodes 55S2 and 55S5 of the second capacitors for vibration detection 45S1B and 45S2B and divided outputs (S3 and S8) from the second partial electrodes 55S3 and 55S8. With respect to the output voltages of these difference computation portions 121A1, 121A2, 121B1, and 121B2, anomaly determination is individually carried out. Based on these four anomaly determination signals, ultimate anomaly determination is carried out. With this constitution, the anomaly determination signal is generated in four systems. However, the number of the partial outputs (partial electrodes) integrated into each system is reduced from four in FIG. 6 to two. As a result, the following advantage is brought when an anomaly or trouble occurs in any of the partial electrodes: relative change in output at the occurrence of an anomaly is further increased with respect to the individual anomaly determination signals. Therefore, the sensitivity for anomaly detection is further enhanced. In this embodiment, the synchronous detection portions 122A1, 122A2, 122B1, and 122B2 and the wind comparators (voltage detection portions) 123A1, 123A2, 123B1, and 123B are provided with respect to each of the outputs of the difference computation portions 121A1, 121A2, 121B1, and 121B2. The logical sum of binary determination outputs from the wind comparators 123A1, 123A2, 123B1, and 123B2 is computed at a gate 124. Its output is used as an ultimate anomaly monitoring signal VJ.

Thus, a vibration type angular velocity sensor according to the first embodiment of the present invention is characterized in that it comprises: a first angular velocity sensor unit and a second angular velocity sensor unit; a vibration driving unit; a signal output unit; and an anomaly monitoring signal generating and outputting unit. The first angular velocity sensor unit and the second angular velocity sensor unit respectively have a vibrator, a vibration driving portion, and a detection waveform generation portion. The vibrators are vibrated in a reference direction. The vibration driving portions vibrate the corresponding vibrators with constant amplitude. The detection waveform generation portions detect a vibration component to be detected in the direction of angular velocity detection when angular velocity is applied to the vibrators. The direction of angular velocity detection is predetermined so that it is orthogonal to the reference direction. Then, the detection waveform generation portions generate angular velocity detection waveform based on the vibration component to be detected.

The vibration driving unit synchronously and vibratorily drives the first angular velocity sensor unit and the second angular velocity sensor unit.

The angular velocity signal output unit has an in-phase waveform synthesis portion. The in-phase waveform synthesis portion synthesizes first angular velocity detection waveform from the first angular velocity sensor unit and second angular velocity detection waveform from the second angular velocity sensor unit in such phase relation that the waveforms are in phase. The angular velocity signal output unit outputs the in-phase synthesized waveform as an angular velocity signal. In this angular velocity signal, the acceleration waveform components respectively superposed on the first and second angular velocity detection waveforms are canceled out.

The anomaly monitoring signal generating and outputting unit has an opposite phase waveform synthesis portion. The opposite phase waveform synthesis portion synthesizes first angular velocity detection waveform from the first angular velocity sensor unit and second angular velocity detection waveform from the second angular velocity sensor unit in such phase relation that the waveforms are in opposite phases. The anomaly monitoring signal generating and outputting unit generates and outputs anomaly monitoring signals with respect to sensor output based on the opposite phase synthesized waveform.

According to the above-mentioned constitution of the first embodiment of the present invention, the following operation is performed to detect any anomaly in the two angular velocity sensor units: the first angular velocity detection waveform and the angular velocity detection waveform are synthesized in such phase relation that the waveforms are in opposite phases; based on the opposite phase synthesized waveform, an anomaly monitoring signal is outputted. When the two sensor units are constructed equivalently in terms of hardware, theoretically, they output the angular velocity detection waveforms with substantially the same amplitude when the same angular velocity is applied. Therefore, when these angular velocity detection waveforms are synthesized in opposite phases, the following occurs when there is no anomaly in both the sensor units: the waveforms cancel out each other, and the amplitude of the opposite phase synthesized waveform becomes very small. However, when any anomaly occurs in either sensor unit, the angular velocity detection waveform of that sensor unit is varied. As a result, both the canceled waveforms get out of balance, and the output of the opposite phase synthesized waveform is increased. Consequently, based on the opposite phase synthesized waveform, an anomaly monitoring signal with respect to sensor output is generated and outputted. Thus, even when an anomaly occurs in an internal component such as a vibrator or an electrode for vibration detection as well as the output system of both the sensor units, it can be detected with reliability.

Further, a vibration type angular velocity sensor according to the first embodiment of the present invention can be so constructed that the following takes place: the respective vibrators are synchronously vibrated in opposite phases in the reference direction in the first angular velocity sensor unit and the second angular velocity sensor unit. Thus, first and second angular velocity detection waveforms whose phase is inverted from the other's are generated. In this case, the in-phase waveform synthesis portion of the angular velocity signal output unit can be formed of a differential waveform computing means. The differential waveform computing means computes the differential waveform between the first angular velocity detection waveform and the second angular velocity detection waveform. The opposite phase waveform synthesis portion of the anomaly monitoring signal generating and outputting unit can be formed of an added waveform computing means. The added waveform computing means computes the added waveform between the first angular velocity detection waveform and the second angular velocity detection waveform. With this constitution, the differential waveform between two angular velocity waveforms in opposite phases is obtained. Thus, translational acceleration components superposed on both the waveforms in phase can be effectively removed from the angular velocity output of a vibration type angular velocity sensor. Furthermore, the two angular velocity waveforms are eventually added together, and the amplitude is increased. Therefore, the influence of the acceleration component remaining on the angular velocity signal ultimately obtained can be significantly reduced. Meanwhile, any anomaly in the two sensor units can be detected with reliability by the added waveform computing means as an opposite phase synthesis portion, provided separately from the differential waveform computing means.

With the above-mentioned constitution, anomalies can be detected by detecting the level of in-phase synthesized waveform used as an angular velocity signal in some cases. However, this method involves a problem. When only a minor anomaly occurs in the vibrator, an electrode, or the like of a sensor unit, the in-phase synthesized waveform is not varied so much as compared with a normal state. Anomalies are difficult to detect with reliability unless the amplitude of angular velocity detection waveform in either unit is exceptionally and greatly varied. Another drawback is as follows: even in a state in which no anomaly occurs, the in-phase synthesized waveform is greatly varied according to the state of angular velocity detection. Thus, the waveform in non-abnormal state cannot be used as the base for anomaly detection. The output of opposite phase synthesized waveform used for anomaly detection in the first embodiment of the present invention is at the amplitude level close to zero in a normal state. Therefore, the waveform in a non-abnormal state is substantially flat regardless of the state of angular velocity detection. Thus, it can be utilized as the base for anomaly detection. As a result, even when an anomaly that occurs is slight, change in the output of the opposite phase synthesized waveform can be read with ease, and the anomaly can be detected with reliability.

In a vibration type angular velocity sensor according to the first embodiment of the present invention, the detection waveform generation portions of the first angular velocity sensor unit and the second angular velocity sensor unit are capacitors for vibration detection. The capacitors for vibration detection change the distances between electrodes in correspondence with waveform vibration to be detected. The electrodes positioned on the signal output side of the capacitors for vibration detection are divided into a plurality of partial electrodes. The charge change output of the capacitors for vibration detection that gives angular velocity waveform is taken out from the individual partial electrodes in the form of divided outputs. The anomaly monitoring signal generating and outputting unit generates anomaly monitoring signals based on the divided outputs. With respect to the output of angular velocity waveform detection using the capacitors for vibration detection, the state of the output is influenced by partial defect such as chipping or warp of an electrode. This can cause an error or malfunction. However, when output from the normal electrodes largely contributes, change in the output of the entire electrodes remains slight. Therefore, precise anomaly detection is impossible, and detection of an anomaly that is a sign of major defect in the future or the like generally becomes difficult. However, more precise anomaly detection can be implemented by the following: one electrode is divided into partial electrodes, and the output is taken out of the individual partial electrodes in the form of divided outputs. Thus, change in the capacitances of the capacitors for vibration detection is divided in parallel in correspondence with the formation of the partial electrodes. Therefore, even when such a minor anomaly as to remain in the individual partial electrodes occurs, the influence of the anomaly largely manifests itself in the divided outputs of the partial electrodes.

The electrodes of the capacitors for vibration detection can be so constructed that they comprise: detection-side comb-like movable electrodes that are provided on the side of the vibrator; and detection-side comb-like fixed electrodes that are provided on the side of a frame that houses the vibrators and are engaged with the movable electrodes. In this case, it is better to divide the detection-side fixed electrodes, rather than the movable electrodes that are vibratorily driven, into partial electrodes because of the following advantages: when the electrodes are divided, isolation between electrodes is facilitated, and the construction can be simplified. In electrodes formed like a comb for increasing the detection capacity, unit electrodes that form the teeth of the "comb" are prone to develop defect such as chipping or warp due to factors in manufacturing during the formation or assembly of the electrodes. By dividing the electrodes into the partial electrodes, the above-mentioned effects can be exceptionally remarkably brought about.

(Second Embodiment)

Figure 8A:
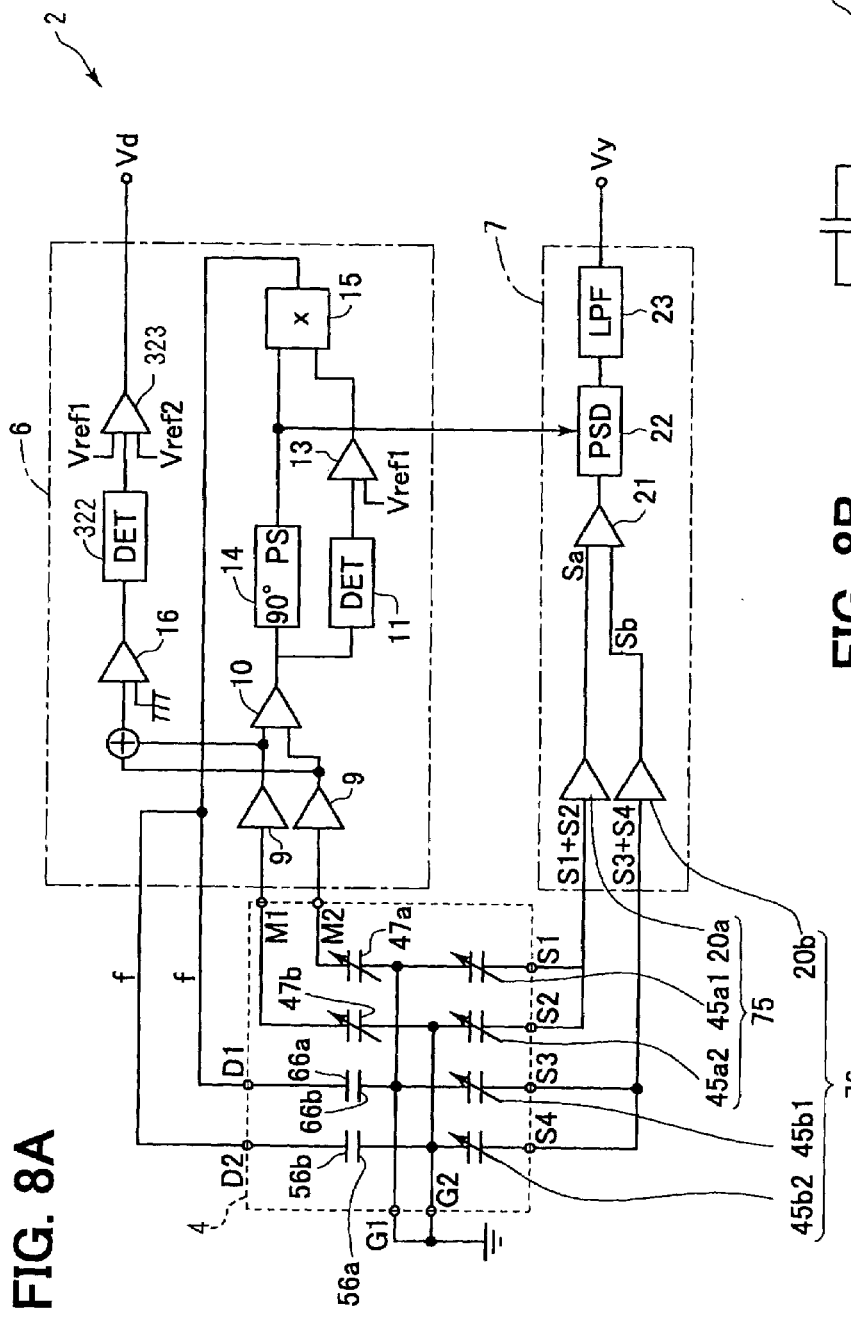
FIGS. 8A and 8B are circuit diagrams showing a vibration type angular velocity sensor according to a second embodiment of the present invention.
Figure 8B:
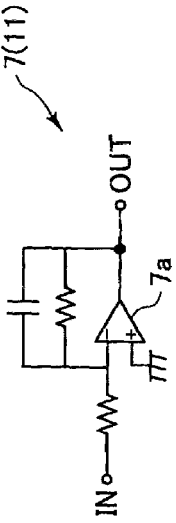
Figure 9:
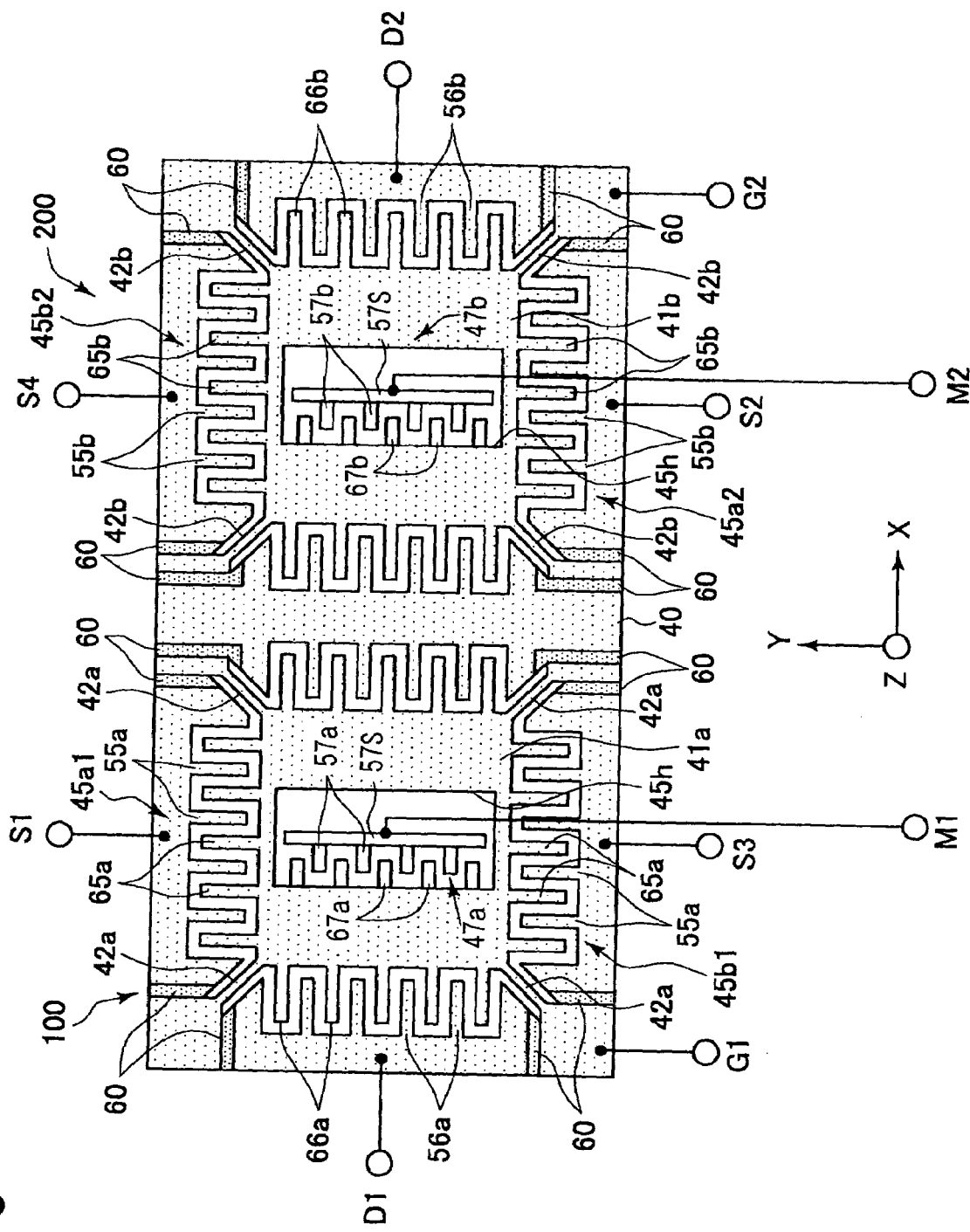
FIG. 9 is a plan view showing the first and the second sensor units in the vibration type angular velocity sensor according to the second embodiment.

FIGS. 8A and 8B are circuit diagrams of a vibration type angular velocity sensor 2 according to a second embodiment of the present invention. The circuit includes a vibration unit 4, a vibration driving unit 6, and an angular velocity detecting unit 7. As illustrated in FIG. 9, the vibration unit 4 comprises a first sensor unit 100 and a second sensor unit 200. The sensor units 100, 200 have vibrators 41a and 41b that vibrate in the predetermined X direction (reference direction). When angular velocity is applied to the vibrators 41a and 41b, a vibration component to be detected in the Y direction (direction of angular velocity detection) predetermined to be orthogonal to the X direction is detected. As illustrated in FIGS. 8A and 8B, specifically, detection waveform generation portions 75 and 76 generate angular velocity detection waveforms based on the vibration components to be detected. When translational acceleration is applied, an acceleration waveform component is superposed on an angular velocity waveform component in vibration waveform to be detected. With respect to the first sensor unit 100 and the second sensor unit 200, the above-mentioned reference direction and direction of angular velocity detection are predetermined so that the following occurs: due to opposite phase vibration type driving of the vibrators 41a and 41b, their vibration waveforms to be detected are in phase in either of the angular velocity waveform component and the acceleration waveform component superposed thereon, and are in opposite phases in the other. (That is, the directions are predetermined so that either the acceleration waveform component or the angular velocity waveform component can be canceled by addition or difference.) In this embodiment, the first sensor unit 100 and the second sensor unit 200 are disposed adjacently to each other in the X direction. The vibrators 41a and 41b are vibratorily driven in mirroring-like symmetric relation in the X direction. However, the second embodiment of the present invention is not limited to this constitution.

The vibration unit 4 is formed using semiconductor micromachining technology for Silicon or the like, for example. In the constitution illustrated in FIG. 9 as an example, the vibrator 41a of the first sensor unit 100 is attached to a frame 40 through beams 42a. The vibrator 41b of the second sensor unit 200 is attached to another frame 40 integral with the above frame 40 through beams 42b. The vibrators 41a and 42a are attached to the frames 40 so that they can be independently vibrated in the X direction and in the Y direction orthogonal thereto.

Comb-like driving-side fixed electrodes 56a and 56b are installed on the inside surfaces of the ends of the frames 40 of the sensor units 100 and 200 in the X direction (that is, in the direction of vibration type driving). The fixed electrodes 56a and 56b are unit electrodes for the X direction and arranged at equal intervals in the Y direction. Comb-like driving-side movable electrodes 66a and 66b are installed on the end faces of the vibrators 41a and 41b in the X direction. The movable electrodes 66a and 66b are unit electrodes for the X direction and arranged at equal intervals in the Y direction with a gap between them and the driving-side fixed electrodes 56a and 56b. The fixed electrodes 56a and 56b and the movable electrodes 66a and 66b are arranged in a staggered format.

Capacitors for vibration detection 45a1, 45b1, 45b2, and 45a2 are provided at the ends (four places in total) of the sensor units 100 and 200 in the Y direction (that is, in the direction of angular velocity detection). Specifically, comb-like detection-side fixed electrodes 55a and 55b are installed on the inside surfaces of the ends of the frames 40 in the Y direction. The fixed electrodes 55a and 55b are unit electrodes for the Y direction and arranged at equal intervals in the X direction. Comb-like detection-side movable electrodes 65a and 65b are installed on the corresponding end faces of the vibrators 41a and 41b in the Y direction. The movable electrodes 65a and 65b are unit electrodes for the Y direction and arranged at equal intervals in the X direction with a gap between them and the detection-side fixed electrodes 55a and 55b. The fixed electrodes 55a and 55b and the movable electrodes 65a and 65b are arranged in a staggered format. These detection-side movable electrodes 65a and 65b and detection-side fixed electrodes 55a and 55b form the above-mentioned capacitors for vibration detection 45a1, 45b1, 45b2, and 45a2. With respect to the capacitors for vibration detection (45a1 and 45b1, and 45b2 and 45a2) positioned on the opposite side in the Y direction, angular velocity waveform components and acceleration waveform components also show up in opposite phases.

A cavity for monitoring 45h for the Y direction is respectively formed in the vibrators 41a and 41b of the sensor units 100 and 200. Capacitors for monitoring amplitude 47a and 47b are provided in each cavity 45h for feedback-controlling driving number of vibration. Specifically, a stem for electrode support 57s in the Y direction is inserted in each cavity 45h. One end of each stem for electrode support 57s is fixed on the frame 40 in a position not shown in the figure, and comb-like monitor-side fixed electrodes 57a and 57b are installed on the stems for electrode support 57s on one side. The fixed electrodes 57a and 57b are unit electrodes for the X direction and arranged at equal intervals in the Y direction. Comb-like monitor-side movable electrodes 67a and 67b are installed on the corresponding end faces of the cavities for monitoring 45h in the X direction. The movable electrodes 67a and 67b are unit electrodes for the X direction and arranged at equal intervals in the Y direction with a gap between them and the monitor-side fixed electrodes 57a and 57b. The fixed electrodes 57a and 57b and the movable electrodes 67a and 67b are arranged in a staggered format. These monitor-side movable electrodes 67a and 67b and monitor-side fixed electrodes 57a and 57b form the above-mentioned capacitors for monitoring amplitude 47a and 47b.

The vibrators 41a and 41b are connected, together with the electrodes 65a, 66a, 67a, 65b, 66b, and 67b formed on their surfaces, to GND terminals G1 and G2 through the beams 42b and the frames 40, and are externally connected to GND. The driving terminals D1 and D2, angular velocity waveform detection terminals S1, S2, S3, and S4, and vibration monitoring terminals M1, M2 are formed on the surfaces of the frames 40. The driving terminals D1 and D2 are connected to the driving-side fixed electrodes 56a and 56b. The angular velocity waveform detection terminals S1, S2, S3, and S4 are connected to the detection-side fixed electrodes 55a and 55b. The vibration monitoring terminals M1, M2 are connected to the monitor-side fixed electrodes 57a and 57b. The terminals are electrically separated from one another by isolation portions 60.

Back in FIGS. 8A and 8B, the capacitors for vibration detection 45a1 and 45a2, together with a charge-voltage converter 20a that converts electric charges stored therein into voltage, constitute the detection waveform generation portion 75. Also, the capacitors for vibration detection 45b1 and 45b2, together with a charge-voltage converter 20b, similarly constitute the detection waveform generation portion 76. These charge-voltage converter 20a and charge-voltage converter 20b, a differential amplifier 21, a synchronous detection portion 22, and a low-pass filter 23 constitute the angular velocity detecting unit 7. The differential amplifier 21 (differential waveform computing means) differentially amplifies the outputs of the charge-voltage converters 20a and 20b. The synchronous detection portion 22 extracts acceleration components in predetermined frequency bands. The low-pass filter 23 removes unwanted high-frequency components such as harmonics from the output of the synchronous detection portion 22.

The vibration driving unit 6 comprises: a charge-voltage converter 10 that converts electric charges stored in the capacitors for monitoring amplitude 47a and 47b into voltage; an AC-DC converter (rectification unit) 11 that converts its vibration type alternating-current voltage output into direct-current; a reference voltage generation unit 12 that takes the output voltage of the AC-DC converter 11 as an amplitude monitoring value and supplies the reference voltage Vref; a differential amplifier 13 that amplifies the difference between the amplitude monitoring value and the reference voltage Vref; a phase shifter 14 that shifts the phase of the vibration type voltage output from the charge-voltage converter 10 by 90 degrees; and a multiplier 15 that multiplies the output of the differential amplifier 13 and the output of the phase shifter 14. The output of the multiplier 15 is inputted as vibration type driving voltage waveform to the driving terminals D1 and D2 of the first sensor unit 100 and the second sensor unit 200.

In the vibration driving unit 6, vibration of the vibrators 41a and 41b in the X direction is taken as a vibration monitoring signal out of the monitoring terminals M1, M2 through change in the capacitances of the capacitors for monitoring amplitude 47a and 47b. (Thus, the first and second amplitude monitoring units are formed.) In the sensor units 100 and 200 in FIG. 9, the monitor-side movable electrodes 67a and 67b of the capacitors for monitoring amplitude 47a and 47b are disposed as follows: the monitor-side movable electrodes 67a and 67b are disposed on the same side (left side in FIG. 9) in the direction of vibration (that is, in the X direction) relative to the fixed-side electrodes 57a and 57b. Therefore, when the vibrators 41a and 41b are synchronously vibrated in opposite phases in the X direction, the vibration monitoring waveforms from the capacitors for monitoring amplitude 47a and 47b are also in opposite phases.

The first and second amplitude monitoring waveforms from the capacitors for monitoring amplitude 47a and 47b are converted into voltage signals through charge-voltage converters 9. Further, they are subjected to difference computation at the differential amplifier 10. Obtaining the difference between waveforms in opposite phases is equivalent to adding waveforms in phase. With respect to the amplitude monitoring signals of the two units 100 and 200, their amplitudes are added and synthesized at the differential amplifier 10, and the signal level is enhanced. That is, the differential amplifier 10 constitutes an in-phase waveform synthesis portion. The amplitude monitoring signal obtained as the result of synthesis is fed back to the driving terminals D1 and D2 through the phase shifter 14 and the multiplier 15. Thus, a self-excited vibratorily driving mechanism is constructed.

The phase shifter 14 functions to sustain mechanical vibration in proximity to the resonance point of the vibrators 41a and 41b through beams 60. The synthesized vibration monitoring signal from the differential amplifier 10 is separately smoothed at the AC-DC converter 11, and turned into an amplitude level signal. The difference between the amplitude level signal and the reference voltage signal from the reference voltage generation unit 12 corresponding to control amplitude level is computed at the differential amplifier 13. The output of the differential amplifier 13 is taken as an amplitude correction signal, and is multiplied by the vibration monitoring signal at the multiplier 15. Thus, driving amplitude is controlled to a constant value. The driving terminals D1 and D2 of the first sensor unit 100 and the second sensor unit 200 are formed at non-corresponding ends of the frames 40 in the X direction. The driving outputs from the multiplier 15 are inputted in phase. Thus, the vibrators 41a and 41b of both the units 100 and 200 are vibratorily driven in opposite phases with the resonance frequency in the X direction.

In this state, if angular velocity is inputted around the Z direction orthogonal both to the X direction and to the Y direction, the following occurs (In case of mounting on an automobile, the Z direction is a direction orthogonal to the road surface.): In the vibrators 41a and 41b, angular velocity vibration components are produced in opposite phases with an amplitude corresponding to the magnitude of the angular velocity by Coriolis force. These angular velocity vibration components are produced in the Y direction. This vibration is detected as change in the capacitances of the capacitors for vibration detection 45a1, 45b1, 45b2, and 45a2, and taken out through the terminals S1 and S2 and terminals S3 and S4. Thereafter, it is converted into voltage through the charge-voltage converters 20a and 20b, and is outputted as angular velocity detection waveforms Sa and Sb.

Figure 10A:
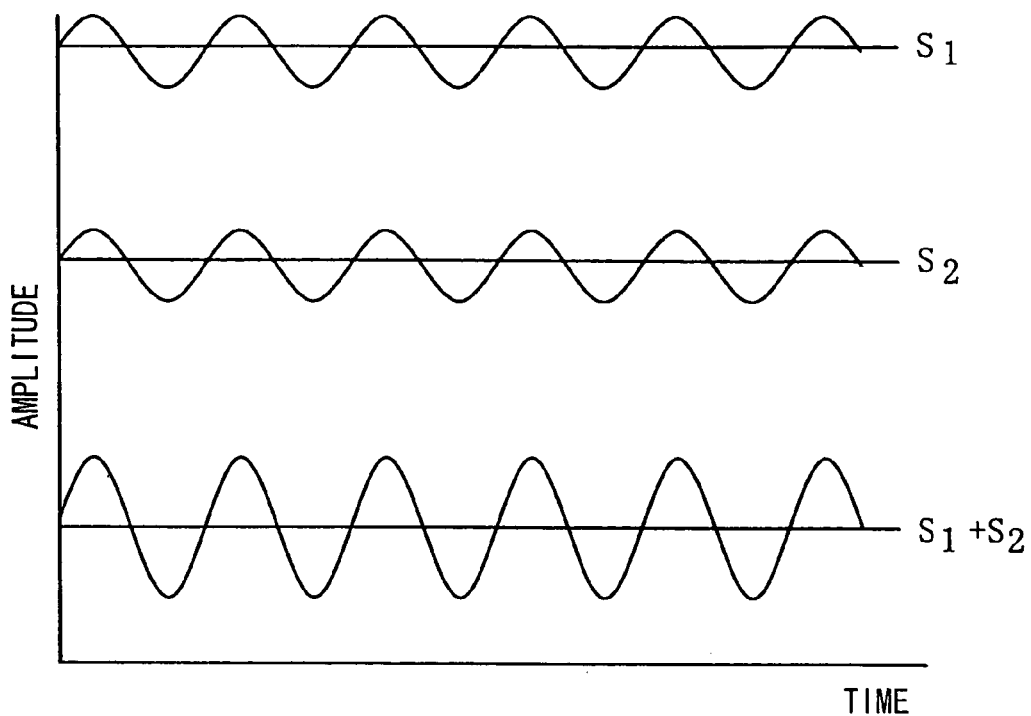
FIGS. 10A and 10B are graphs of waveforms explaining addition of angular velocity detection waveforms from electrodes in the vibration type angular velocity sensor according to the second embodiment.
Figure 10B:
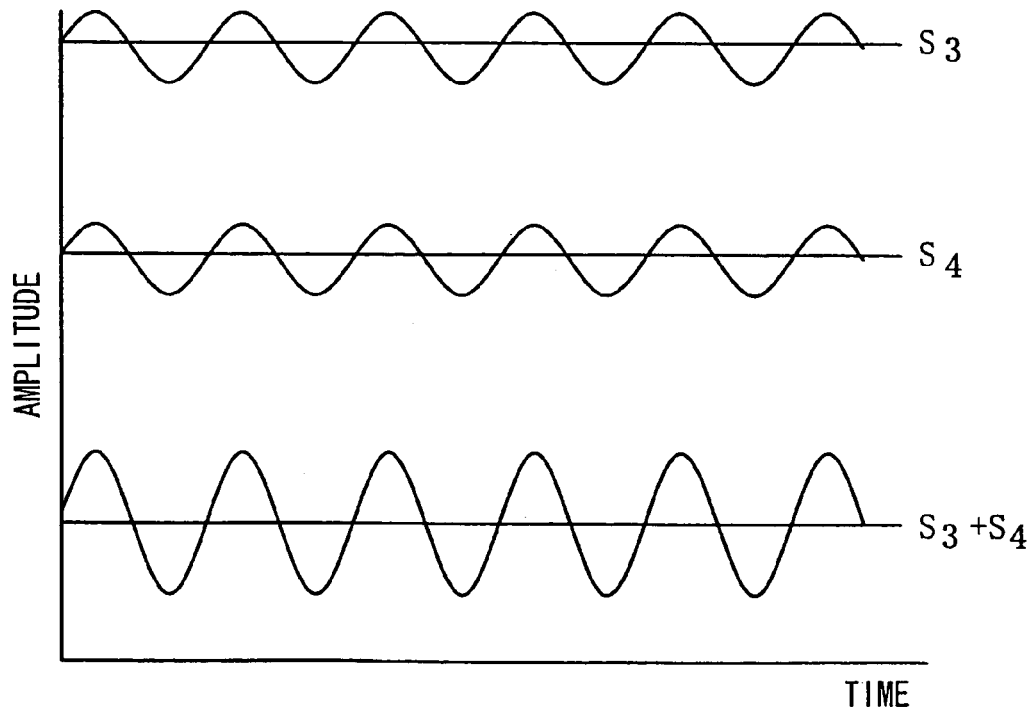

Coriolis force is exerted on the vibrators 41a and 41b in opposite directions. For this reason, in the capacitors for vibration detection 45a1 and 45b1 of the first sensor unit 100 and the capacitors for vibration detection 45b2 and 45a2 of the second sensor unit 200, the following occurs: the elements positioned on the side opposite to each other in the Y direction respectively generate angular velocity detection waveforms in phase, as illustrated in FIGS. 10A and 10B. That is, the capacitors 45a1 and 45a2 (terminals S1 and S2) and the capacitors 45b1 and 45b2 (terminals S1 and S2) generate angular velocity detection waveforms in phase. The angular velocity detection waveforms in phase (the terminals S1 and S2 and the terminals S3 and S4 in FIGS. 8A and 8B) are added in terms of amplitude, and respectively inputted to the charge-voltage converters 20a and 20b in FIGS. 8A and 8B. Thus, devices are made to enhance the sensitivity for angular velocity detection.

Figure 11:
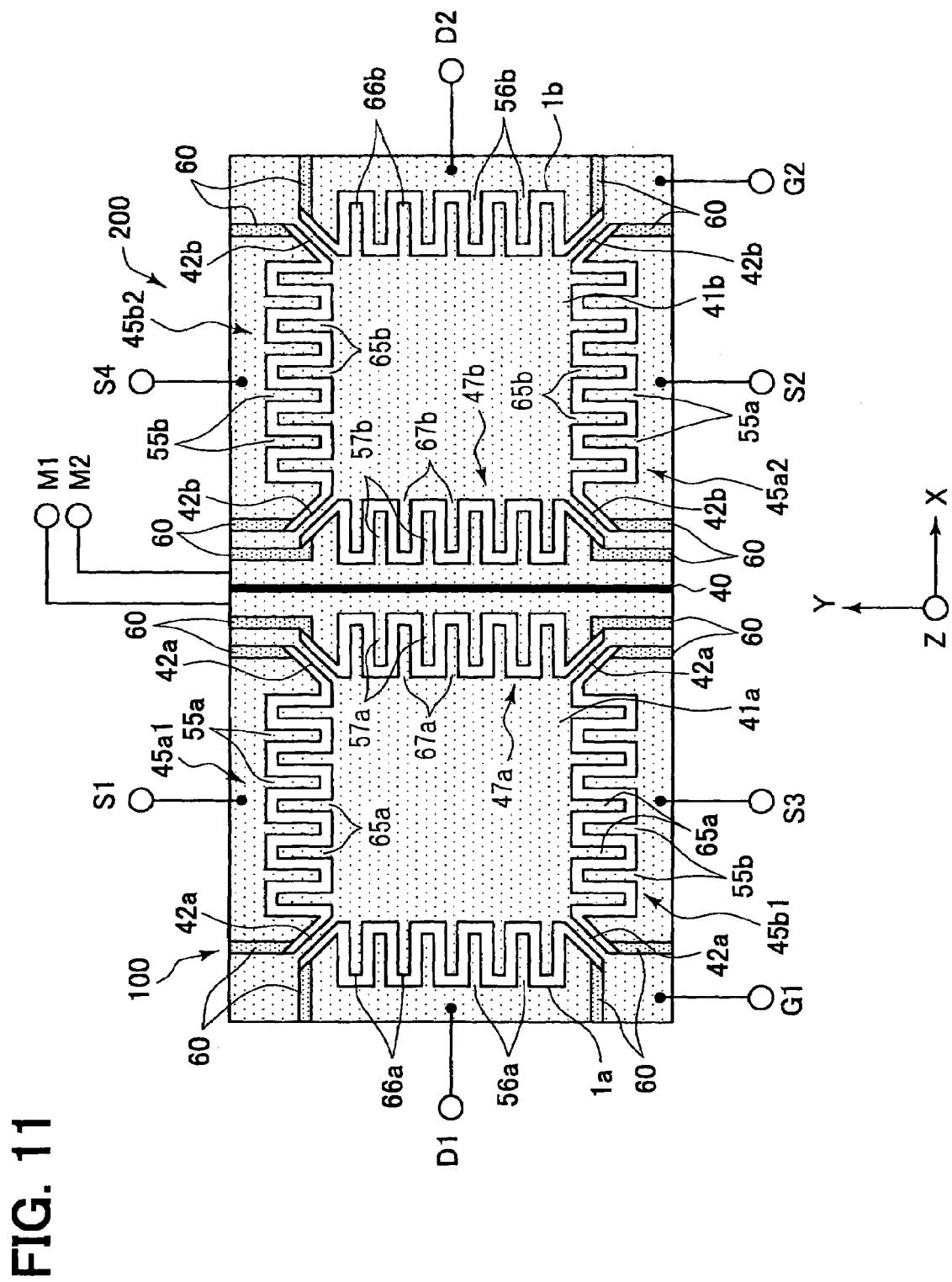
FIG. 11 is a plan view showing the first and the second sensor units in a vibration type angular velocity sensor according to a modification of the second embodiment.

In the angular velocity detecting unit 7, the angular velocity detection waveform signals Sa and Sb from the charge-voltage converters 20a and 20b are in opposite phases. Therefore, when difference computation is carried out at the differential amplifier 21, these two waveform signals are further added in terms of amplitude, and the sensitivity for angular velocity detection is further enhanced. In the units 100 and 200 that are vibratorily driven in opposite phases, Coriolis forces produced in the Y direction when angular velocity is applied around the Z direction are detected in opposite directions, as illustrated in FIG. 11. Meanwhile, translational acceleration waveform components in the Y direction due to rotational centrifugal force or accidental vibration are detected in the same direction. They become a kind of noise components from the viewpoint of angular velocity waveform component. Waveforms whose superposed acceleration waveform components are in phase and whose angular velocity waveform components are in opposite phases between the units 100 and 200 are subjected to difference computation. (Or, waveforms whose superposed acceleration waveform components are in opposite phases and whose angular velocity waveform components are in phase are subjected to adding computation.) Thus, the acceleration components are canceled out, and only angular velocity waveform can be taken out.

With respect to the angular velocity signal output from the differential amplifier 21, the following operation is performed: the angular velocity waveform amplitude-modulated is demodulated at a synchronous detection portion 22, and then ripples are removed through the low-pass filter 23. Then, the signal is outputted as a direct-current signal Vy in proportion to the inputted angular velocity. In this embodiment, the vibration monitoring signal from the phase shifter 14 is used for the reference frequency signal for the synchronous detection portion 22. Coriolis force is produced in proportion to the vector product of the velocity of a vibrator and applied angular velocity. Therefore, the detection waveform of Coriolis force is detected as advanced by 90 degrees from driving vibration waveform without fail. Consequently, the driving vibration waveform advanced by 90 degrees at the phase shifter 14 is identical in phase with the detection waveform of Coriolis force (that is, angular velocity waveform). Thus, it can be optimally used as a reference frequency signal for synchronous detection.

The first and second amplitude monitoring waveforms converted into voltage signals at the charge-voltage converters 9 are respectively branched in the stage preceding the differential amplifier 10 that constitutes the in-phase waveform synthesis portion. The signals are inputted to an adder 16 that constitutes the adding computation portion. As mentioned above, the first and second amplitude monitoring waveforms are in opposite phases; therefore, the adder 16 functions as an opposite phase waveform synthesis portion. The output signal of the adder 16 synthesized in opposite phases is inputted as a driving anomaly monitoring signal to an AC-DC converter 322. In this embodiment, the AC-DC converter 322 is constructed, together with the above-mentioned AC-DC converter 11, as an active low-pass filter including an analog operational amplifier.

If the driving amplitudes of the two sensor units 100 and 200 are both normal, the amplitudes of the two amplitude monitoring waveforms are substantially equal to each other. As a result, the amplitude of a driving anomaly monitoring signal generated as their opposite phase synthesized waveform exhibits a level close to the neutral point. However, if any anomaly occurs in the driving amplitude of either sensor unit 100 or 200, the amplitude value of the driving anomaly monitoring signal is shifted from the neutral point. Therefore, if the driving anomaly monitoring signal is inputted to a wind comparator 323 having reference voltage ranges "Vref2 and Vref 3" including the above-mentioned neural point, the following can be implemented: a signal indicating whether the driving anomaly monitoring signal is within the predetermined ranges or not, that is, whether the signal is anomalous or not can be outputted as an anomaly detection signal Vd from the wind comparator 323.

The second embodiment of the present invention is characterized in that the driving anomaly monitoring signal is generated by synthesizing the first and second amplitude monitoring waveforms in opposite phases. The margin for the driving anomaly monitoring signal is restricted, for example, by the operating limit voltage of the operational amplifier 7a of the active filter that constitutes the AC-DC converter 322. When the output of the adder 16 becomes too large, the output of the operational amplifier 7a is saturated, and this prevents accurate anomaly detection. As illustrated in FIGS. 12A to 12H, even if there is no anomaly in the waveform obtained by synthesizing the first and second amplitude monitoring waveforms in phase as conventional, a problem arises. (The above waveform is equivalent to the output of the differential amplifier 10 of the vibration type driving control unit.) The amplified and added amplitude 2A×G of the two amplitude monitoring waveforms stays as added. For this reason, much of the output voltage of the operational amplifier 7a is eaten up by 2A×G, and anomaly determination must be carried out with the remaining little voltage margin. Therefore, even if the anomalous amplitude component α×G becomes only slightly too large, the output of the operational amplifier 7a is saturated. Thus, accurate anomaly detection becomes difficult. Meanwhile, if the opposite phase synthesized waveform is used as the driving anomaly monitoring signal as in the second embodiment of the present invention, the above-mentioned portions of 2A×G of both the waveforms are canceled out and becomes substantially nonexistent. The margin for the anomalous amplitude component α can be significantly increased. That is, accurate and high-sensitivity anomaly detection that makes full use of the output range of the operational amplifier 7a becomes feasible.

As illustrated in FIG. 11, the monitor-side movable electrodes 67a and 67b of the capacitors for monitoring amplitude 47a and 47b may be so disposed that the following takes place by utilizing the inside surfaces of the frames 40 or by like means: the monitor-side movable electrodes 67a and 67b are positioned opposite to each other relative to the fixed-side electrodes 57a and 57b in the sensor units 100 and 200 in the direction of vibration (that is, in the X direction). When the vibrators 41a and 41b are synchronously vibrated in opposite phases in the X direction in this case, the vibration monitoring waveforms from the capacitors for monitoring amplitude 47a and 47b are in phase. In this case, the differential amplifier 10 in FIGS. 8A and 8B is displaced with an adder, and the adder 16 is displaced with a differential amplifier. Thus, they can be respectively used as an in-phase waveform synthesis portion and an opposite phase waveform synthesis portion, and the sensor functions equivalent to those described with reference to FIGS. 8A and 8B are implemented.

Thus, a vibration type angular velocity sensor according to the second embodiment of the present invention is characterized in that it comprises: a first angular velocity sensor unit and a second angular velocity sensor unit; a first and a second amplitude monitoring units; and a driving anomaly monitoring signal generating and outputting unit.

The first angular velocity sensor unit and the second angular velocity sensor unit respectively have a vibrator, a vibration driving portion, and a detection waveform generation portion. The vibrators are vibrated in a predetermined reference direction. The vibration driving portions drive the vibrators with constant amplitude. The detection waveform generation portion detects a vibration component to be detected in the direction of angular velocity detection when angular velocity is applied to the vibrators. The direction of angular velocity detection is predetermined so that it is orthogonal to the reference direction. Then, the detection waveform generation portions generate angular velocity detection waveforms based on the vibration component to be detected.

The first and second amplitude monitoring units respectively detect the driving amplitude in the reference direction of the vibrators of the first angular velocity sensor unit and the second angular velocity sensor unit. Then, the first and second amplitude monitoring units output amplitude monitoring waveforms.

The driving anomaly monitoring signal generating and outputting unit has an opposite phase waveform synthesis portion. The opposite phase waveform synthesis portion synthesizes first amplitude monitoring waveform detected by the first amplitude monitoring unit and second amplitude monitoring waveform detected by the second amplitude monitoring unit. The waveforms are synthesized in such phase relation that they are in opposite phases. The driving anomaly monitoring signal generating and outputting unit outputs driving anomaly monitoring signals based on the opposite phase synthesized waveforms.

According to the above-mentioned constitution in the second embodiment of the present invention, the following operation is performed to detect any anomaly in the vibration amplitude of the two angular velocity sensor units: the first amplitude monitoring waveform and the second amplitude monitoring waveform are daringly synthesized in such phase relation that they are in opposite phases; based on the opposite phase synthesized waveform, a driving anomaly monitoring signal is outputted. When this operation is performed, the fiducial amplitude components A contained in the amplitude monitoring waveforms from both the sensor units cancel out each other, as illustrated in the right part of FIGS. 12A to 12H. Therefore, the margin for the anomalous amplitude component α is significantly increased, and anomalies can be detected with accuracy.

An analog computing and amplifying circuit for amplifying the opposite phase synthesized waveform can be specially provided in the opposite phase waveform synthesis portion or downstream from the output of the opposite phase waveform synthesis portion. In this case, the restriction of the operating limit voltage of the analog computing and amplifying circuit is imposed on amplitude anomaly detection. Description will be given with reference to FIGS. 12A to 12H. In conventional methods, of the signal margin that is determined according to the operating limit voltage of the circuit, the portion (2A×G) equivalent to twice the fiducial amplitude component A is eaten up from the beginning. As a result, the voltage range within which anomaly determination is feasible is remarkably narrowed. This results in the following problem: even if the anomalous amplitude component becomes only slightly too large, the output of the analog computing and amplifying circuit is saturated in a short order because of the contribution (α×G) of that. Thus, accurate anomaly detection becomes very difficult. According to the second embodiment of the present invention, meanwhile, the above-mentioned portion of 2A×G is canceled out and becomes substantially nonexistent. The margin for the anomalous amplitude component α can be accordingly and significantly increased. That is, accurate and high-sensitivity anomaly detection that makes full use of the output range of the analog computing and amplifying circuit becomes feasible.

Specifically, the driving anomaly monitoring signal generating and outputting unit is provided with a rectification unit that rectifies the above-mentioned opposite phase synthesized waveform. The rectification unit can be constructed as an element (e.g. active filter) including the analog computing and amplifying circuit. With this constitution, the opposite phase synthesized waveform is rectified to direct current, and thus anomaly detection carried out using it can be simplified. As mentioned above, the anomalous amplitude component α of the opposite phase synthesized waveform inputted to the rectification unit can be significantly increased. Therefore, anomaly detection can be carried out with accuracy and high sensitivity even though the rectification unit includes the analog computing and amplifying circuit.

In this case, anomaly determination may be externally carried out using the level output of the rectification unit. Or, an anomaly determination circuit to which the level output is inputted may be provided so that its output is externally taken out in the form of anomaly determination signal.

If the vibrators of the first angular velocity sensor unit and the second angular velocity sensor unit are synchronously driven, a vibration type driving control unit can be provided. The vibration type driving control unit has an in-phase waveform synthesis portion that synthesizes first amplitude monitoring waveform and second amplitude monitoring waveform in such phase relation that they are in phase. Based on the amplitude of the synthesized waveform, the vibration type driving control unit controls the driving amplitudes of the first angular velocity sensor unit and the second angular velocity sensor unit by the vibration driving unit. In this case, the amplitude of the in-phase synthesized waveform is used as the base for vibration type driving control. In normal operation, the signal level equivalent to twice the above-mentioned fiducial amplitude component A can be used in vibration type driving control. Thus, the noise margin and the like are increased, and this contributes to the enhancement of the accuracy of amplitude control. In the second embodiment of the present invention in this case, the opposite phase waveform synthesis portion of the driving anomaly monitoring signal generating and outputting unit is provided in the stage preceding the in-phase waveform synthesis portion of the vibration type driving control unit. That is, the in-phase synthesized waveform is strictly dedicated to vibration type driving control. It is branched from the amplitude monitoring waveform in the stage preceding the in-phase waveform synthesis portion for vibration type driving control. Then, it is inputted to the opposite phase waveform synthesis portion dedicated to anomaly detection. Thus, the accuracy of amplitude control can be maintained, and further anomaly detection can be carried out with high sensitivity by the opposite phase synthesized waveform.

The respective vibrators are synchronously vibrated in opposite phases in the reference direction in the first angular velocity sensor unit and the second angular velocity sensor unit. Thus, the vibration driving units of the first angular velocity sensor unit and the second angular velocity sensor unit can generate angular velocity detection waveform as first and second angular velocity detection waveforms in opposite phases. A differential waveform computing means can be provided in correspondence therewith. The differential waveform computing means computes the differential waveform between the first angular velocity detection waveform and the second angular velocity detection waveform. The differential waveform computing means thereby outputs, as an angular velocity signal, waveform in which in-phase acceleration waveform components superposed on the angular velocity detection waveforms are canceled out. With this constitution, the difference signal between two angular velocity waveforms in opposite phases is obtained. Thus, translational acceleration components superposed on both the waveforms in phase can be effectively canceled out and removed from the angular velocity output of a vibration type angular velocity sensor. Furthermore, the two angular velocity waveforms are eventually added together, and the amplitude is increased. Therefore, the influence of the acceleration component remaining on the angular velocity signal ultimately obtained can be significantly reduced.

If the first amplitude monitoring waveform and the second amplitude monitoring waveform are synchronously outputted in opposite phases in correspondence with the driving phases of the vibrators of both the sensor units, this constitution enables the following: the opposite phase waveform synthesis portion of the driving anomaly monitoring signal generating and outputting unit can be so constructed that it includes an adding computation portion for the first amplitude monitoring waveform and the second amplitude monitoring waveform. Thus, the opposite phase waveform synthesis portion can be constructed as a simple adding computation portion; therefore, the electrical configuration of the sensor system can be simplified.

Such changes and modifications are to be understood as being within the scope of the present invention as defined by the appended claims.

What is claimed is:

1. A vibration type angular velocity sensor comprising:
 a first angular velocity sensor and a second angular velocity sensor; and
 an anomaly monitoring signal generating and outputting unit including an opposite phase waveform synthesis portion, wherein
 each of the first and the second angular velocity sensors includes:
  a vibrator for being vibrated in a predetermined reference direction;
  a vibration driving unit for vibrating the vibrator with a predetermined constant amplitude; and a detection waveform generation unit for detecting a vibration component of the vibrator in an angular velocity detection direction perpendicular to the reference direction in accordance with an angular velocity applied to the vibrator and for generating a first or a second detection waveform on the basis of the vibration component, the opposite phase waveform synthesis portion synthesizes the first detection waveform obtained from the first angular velocity sensor and the second detection waveform obtained from the second angular velocity sensor in such a manner that a phase of the first detection waveform is opposite to that of the second detection waveform, the first detection waveform is generated in accordance with a displacement of the vibrator in the first angular velocity sensor, and the second detection waveform is generated in accordance with a displacement of the vibrator in the second angular velocity sensor, and the anomaly monitoring signal generating and outputting unit generates and outputs an anomaly monitoring signal for monitoring an anomaly of a sensor output on the basis of a synthesized opposite phase waveform synthesized from the first and the second detection waveforms.

2. The sensor according to claim 1, further comprising:
a signal output unit including an in-phase waveform synthesis portion, wherein
the vibration driving unit vibrates the vibrators of the first and the second angular velocity sensors synchronously,
the in-phase waveform synthesis portion synthesizes the first detection waveform and the second detection waveform in such a manner that a phase of the first detection waveform and a phase of the second detection waveform are in-phase, and
the signal output unit outputs a synthesized in-phase waveform synthesized from the first and the second detection waveforms as an angular velocity signal, in which acceleration waveform components superposed on the first and the second detection waveforms are canceled.

3. The sensor according to claim 2, wherein
the vibrators in the first and the second angular velocity sensors are synchronously vibrated with opposite phase in the reference direction so that the first and the second detection waveforms are obtained, the phases of which are opposite each other,
the in-phase waveform synthesis portion in the signal output unit is provided by difference computation means for computing a differential waveform between the first detection waveform and the second detection waveform, and
the opposite phase waveform synthesis portion in the anomaly monitoring signal generating and outputting unit is provided by addition computation means for computing an additional waveform between the first detection waveform and the second detection waveform.

4. The sensor according to claim 3, wherein
the detection waveform generation unit in each of the first and the second angular velocity sensors is a capacitor for detecting vibration as an electrode distance change in accordance with the vibration of the vibrator,
the capacitor for detecting the vibration includes a signal output side electrode having a plurality of partial electrodes, each of which outputs a divisional output as a charge change output of the capacitor for detecting vibration, wherein the charge change output provides the first or the second detection waveform, and the anomaly monitoring signal generating and outputting unit generates the anomaly monitoring signal on the basis of the divisional outputs of the partial electrodes.

5. The sensor according to claim 4, wherein
the signal output side electrode of the capacitor for detecting the vibration further includes a detection side movable electrode and a detection side fixed electrode,
the partial electrodes of the signal output side electrode is provided by the detection side fixed electrode,
the detection side movable electrode has a comb-teeth shape disposed on a vibrator side,
the detection side fixed electrode has a comb-teeth shape disposed on a frame side for accommodating the vibrator, and
the comb-teeth shape of the detection side fixed electrode is engaged with the comb-teeth shape of the detection side movable electrode.

6. The sensor according to claim 5, wherein
the capacitor for detecting the vibration in each of the first and the second angular velocity sensors includes a first vibration detection capacitor and a second vibration detection capacitor,
the first vibration detection capacitor is disposed on a first end portion of the vibrator in the angular velocity detection direction,
the second vibration detection capacitor is disposed on a second end portion of the vibrator in the angular velocity detection direction,
the first and the second vibration detection capacitors generate the first or the second detection waveforms having opposite phases each other, and
each of the first and the second vibration detection capacitors includes the signal output side electrode provided by a first and a second partial electrodes.

7. The sensor according to claim 6, wherein
the difference computation means synthesizes the divisional outputs outputted from the first and the second partial electrodes of the first vibration detection capacitors in the first angular velocity sensor so that a first anomaly monitoring preparation signal is obtained,
the difference computation means synthesizes the divisional outputs outputted from the first and the second partial electrodes of the second vibration detection capacitors in the first angular velocity sensor so that a second anomaly monitoring preparation signal is obtained,
the first and the second anomaly monitoring preparation signals are in-phase,
the difference computation means synthesizes the divisional outputs outputted from the first and the second partial electrodes of the first vibration detection capacitors in the second angular velocity sensor so that a third anomaly monitoring preparation signal is obtained,
the difference computation means synthesizes the divisional outputs outputted from the first and the second partial electrodes of the second vibration detection capacitors in the second angular velocity sensor so that a fourth anomaly monitoring preparation signal is obtained, and
the third and the fourth anomaly monitoring preparation signals are in-phase.

8. The sensor according to claim 7, wherein
the first angular velocity sensor preliminarily computes to add the first and the second anomaly monitoring preparation signals, the second angular velocity sensor preliminarily computes to add the third and the fourth anomaly monitoring preparation signals, and the difference computation means computes a difference between a preliminarily added first and second anomaly monitoring preparation signals from the first angular velocity sensor and a preliminarily added third and fourth anomaly monitoring preparation signals from the second angular velocity sensor so that the anomaly monitoring signal is obtained as the difference.

9. The sensor according to claim 7, wherein the difference computation means computes a first difference between the first and the third anomaly monitoring preparation signals from the first and the second angular velocity sensors so that a first anomaly of the output voltage of the difference computation means is obtained, the difference computation means computes a second difference between the second and the fourth anomaly monitoring preparation signals from the first and the second angular velocity sensors so that a second anomaly of the output voltage of the difference computation means is obtained, and the anomaly monitoring signal generating and outputting unit performs a final anomaly determination on the basis of the first and the second anomalies.

10. The sensor according to claim 6, further comprising:

a first difference computation means for computing a difference of the divisional output from the first partial electrode of the first vibration detection capacitor between the first and the second angular velocity sensors;

a second difference computation means for computing a difference of the divisional output from the second partial electrode of the first vibration detection capacitor between the first and the second angular velocity sensors;

a third difference computation means for computing a difference of the divisional output from the first partial electrode of the second vibration detection capacitor between the first and the second angular velocity sensors; and a fourth difference computation means for computing a difference of the divisional output from the second partial electrode of the second vibration detection capacitor between the first and the second angular velocity sensors, wherein the difference computation means determines a first anomaly of the output voltage of the first difference computation means, the difference computation means determines a second anomaly of the output voltage of the second difference computation means, the difference computation means determines a third anomaly of the output voltage of the third difference computation means, the difference computation means determines a fourth anomaly of the output voltage of the fourth difference computation means, and the anomaly monitoring signal generating and outputting unit performs a final anomaly determination on the basis of the first to the fourth anomalies.

11. The sensor according to claim 1, further comprising:

a first amplitude monitor for detecting a driving amplitude of the vibrator in the first angular velocity sensor in the reference direction to output the first detection waveform; and a second amplitude monitor for detecting a driving amplitude of the vibrator in the second angular velocity sensor in the reference direction to output the second detection waveform.

12. The sensor according to claim 11, further comprising:

an analog computation amplifier for amplifying a synthesized opposite phase waveform synthesized from the first and the second detection waveforms, wherein the analog computation amplifier is disposed in the opposite phase waveform synthesis portion or on a downstream circuit side of the opposite phase waveform synthesis portion.

13. The sensor according to claim 11, further comprising:

a rectification unit for rectifying a synthesized opposite phase waveform synthesized from the first and the second detection waveforms; and an analog computation amplifier for amplifying the synthesized opposite phase waveform, wherein the rectification unit is disposed in the anomaly monitoring signal generating and outputting unit, and the analog computation amplifier is disposed in the opposite phase waveform synthesis portion or on a downstream circuit side of the opposite phase waveform synthesis portion.

14. The sensor according to claim 11, further comprising:

a vibration driving control unit having an in-phase waveform synthesis portion, wherein the in-phase waveform synthesis portion synthesizes the first detection waveform and the second detection waveform in such a manner that a phase of the first detection waveform and a phase of the second detection waveform are in-phase, the vibration driving control unit controls both of the driving amplitudes of the first and the second angular velocity sensors on the basis of an amplitude of a synthesized first and second detection waveform synthesized from the first and the second detection waveforms with in-phase, the vibration driving unit generates the driving amplitudes of the first and the second angular velocity sensors, the vibrators of the first and the second angular velocity sensors are vibrated synchronously, and the opposite phase waveform synthesis portion in the anomaly monitoring signal generating and outputting unit is disposed before the in-phase waveform synthesis portion of the vibration driving control unit.

15. The sensor according to claim 14, further comprising:

difference waveform computation means for computing a difference waveform between the first detection waveform and the second detection waveform and for outputting a waveform as a angular velocity signal, in which the in phase waveform synthesis portion to be superposed to the first and the second detection waveforms is cancelled, the vibration driving unit of each of the first and the second angular velocity sensors synchronously vibrates the vibrator in the reference direction in opposite phase so that the first or the second detection waveform is generated in opposite phase, the opposite phase waveform synthesis portion in the anomaly monitoring signal generating and outputting unit includes an addition computation portion for adding the first detection waveform and the second detection waveform, and the first detection waveform and the second detection waveform are outputted to be opposite phase synchronously.

* * * * *